US007132026B2

(12) United States Patent
Shioya et al.

(10) Patent No.: US 7,132,026 B2
(45) Date of Patent: Nov. 7, 2006

(54) METHOD FOR MANUFACTURING IMAGE DISPLAY DEVICE

(75) Inventors: Yasushi Shioya, Kanagawa (JP); Kenji Niibori, Kanagawa (JP); Nobuyuki Takahashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 311 days.

(21) Appl. No.: 10/726,536

(22) Filed: Dec. 4, 2003

(65) Prior Publication Data

US 2004/0108044 A1 Jun. 10, 2004

(30) Foreign Application Priority Data

Dec. 10, 2002 (JP) ............................ 2002-357626
Nov. 19, 2003 (JP) ............................ 2003-388657

(51) Int. Cl.
*B29C 65/00* (2006.01)
*B32B 37/00* (2006.01)

(52) U.S. Cl. ...................... 156/160; 156/292; 313/258; 313/411; 313/495; 313/497

(58) Field of Classification Search ................ 156/160, 156/292
See application file for complete search history.

(56) References Cited

U.S. PATENT DOCUMENTS 5,811,927 A * 9/1998 Anderson et al. ........... 313/495
5,912,654 A 6/1999 Ouchi et al. .................. 345/98
6,265,822 B1 * 7/2001 Kuroda et al. .............. 313/495
6,278,066 B1 8/2001 Fahlen et al. ............... 174/250
6,483,235 B1 * 11/2002 Iguchi et al. ............... 313/495
6,571,464 B1 6/2003 Fahlen et al. ................. 29/825
6,803,715 B1 * 10/2004 Mitsutake et al. .......... 313/495
6,836,304 B1 * 12/2004 Sakamaki et al. .......... 349/106

FOREIGN PATENT DOCUMENTS

JP 2000-510282 8/2000
JP 2000311633 A * 11/2000
JP 2002-197998 7/2002
WO WO 98/28774 7/1998

* cited by examiner

*Primary Examiner*—Justin Fischer
(74) *Attorney, Agent, or Firm*—Fitzpatrick, Cella, Harper & Scinto

(57) ABSTRACT

By a method for manufacturing a flat image display device having a plate spacer, even if the center of the plate spacer is displaced from its initial assembly position, it can easily be corrected to the initial assembly position again, allowing stable production of high-quality image display devices. The present invention includes the process of forming a space between the plate spacer and a first substrate between the process of fixing the plate spacer to the first substrate and the process of tightly bonding the first substrate and a second substrate together.

10 Claims, 20 Drawing Sheets

VIEW ON ARROW A

METHOD FOR MANUFACTURING IMAGE DISPLAY DEVICE

BACKGROUND OF THE INVENTION

1. Field of the Invention

The present invention relates to a method for manufacturing a flat image-display device including a plate spacer.

2. Description of the Related Art

Image display devices that use electron-releasing elements are recently being developed as substitutes for known cathode-ray-tube display devices because of low-profile, space saving, and lightweight advantages.

FIG. 4 is a schematic sectional view of a flat image-display device. In the drawing, numeral 1 denotes a rear plate, numeral 2 denoted a side wall, and numeral 3 denotes a face plate. A fluorescent screen 4 and a metal back 5 are provided on the surface of the face plate 3 facing the rear plate 1. A space 6 surrounded by the rear plate 1, the side wall 2, and the face plate 3 is maintained in about $10^{-4}$-Pa vacuum. Therefore, a spacer 7 is provided as a structure-support member for preventing the deformation of the rear plate 1 and the face plate 3 due to the pressure difference between the exterior and the interior of the vacuum vessel.

The spacer 7 is fixed to the rear plate 1 by bonding a support member (spacer support member) 9 fixed to opposite ends thereof to the rear plate 1. The rear plate 1 with the spacer 7 and the face plate 3 are fixed in alignment.

In the image display device, at the instant when electrons are released from electron-releasing elements (not shown) arranged on the rear plate 1, the electrons are accelerated by applying hundreds to thousands of volts of high voltage to the metal back 5 to collide against the face plate 3, so that fluorescent substances of the fluorescent screen 4 are excited to emit light, thereby displaying an image.

However, the known image display devices made as in FIG. 4 have the following problems.

As described above, although the opposite ends of the spacer 7 are bonded to the rear plate 1 with the spacer support member 9, the center of the spacer 7 is merely in contact with the rear plate 1 and is not fixed thereto.

Therefore, when the rear plate 1 with the spacer 7 is given an external impact by transfer or the like after the completion of assembly of the spacer 7 and the rear plate 1 before the start of the assembly of the rear plate 1 and the face plate 3, the center of the spacer 7 may be displaced from the initial assembly position.

When the center of the spacer 7 is displaced from the initial assembly position, there is a high possibility that the spacer 7 will not return to the initial position owing to the frictional resistance between the spacer 7 and the rear plate 1, thus not ensuring accuracy of spacer assembly position.

Therefore, when the rear plate 1 and the face plate 3 are joined, with the center of the spacer 7 displaced from the initial position, it may exert a bad influence on the display image, thus preventing stable production of high-quality image display devices.

SUMMARY OF THE INVENTION

It is an object of the present invention to solve the above-described problems of a flat image-display device having a plate spacer, so that even when the center of the spacer is displaced form the initial assembly position, it can easily be corrected to the designed position, to allow a high-quality image display device to be produced with stability.

The structure of the present invention to achieve the above object is as follows:

A method for manufacturing an image display device according to the present invention includes the steps of: fixing the ends of the length of a plate spacer to a first substrate while disposing the plate spacer on the surface of the first substrate such that the length of the plate spacer is parallel to the surface of the first substrate; and tightly bonding the first substrate and a second substrate together through the plate spacer while disposing the second substrate to face the first substrate having the plate spacer fixed thereto. The method further includes the step of forming a space between the plate spacer and the surface of the first substrate between the process of fixing the plate space to the first substrate and the process of bonding the first substrate and the second substrate together.

Preferably, the process of forming a space is performed by the deformation of the first substrate.

Preferably, the process of forming a space is performed by an elastic member provided at the end of the plate spacer. The elastic member is preferably made of a shape-memory alloy.

In the process of fixing the plate spacer to the first substrate, preferably, a tension acting along the length of the plate spacer is loaded on the plate spacer in advance.

According to the method for manufacturing an image display device of the invention, by forming a space between the plate spacer and the surface of the substrate before bonding the first substrate and the second substrate, it is corrected to its designed initial assembly position even if the center of the spacer is displaced from the initial assembly position.

A method for manufacturing an image display device according to the invention includes the steps of: fixing the end of the length of a plate spacer to a first substrate while disposing the plate spacer on the surface of the first substrate such that the length of the plate spacer is parallel to the surface of the first substrate and forming a space between the center of the plate spacer and the first substrate; and tightly bonding the first substrate and a second substrate together through the plate spacer while disposing the second substrate to face the first substrate having the plate spacer fixed thereto. The method further includes the step of carrying the first substrate having the plate spacer fixed thereto between the process of fixing the plate space to the first substrate and the process of bonding the first substrate and the second substrate together.

Preferably, the process of fixing the end of the length of the plate spacer to the first substrate is performed by bonding the support member provided at the end of the plate spacer to the first substrate. The support member is preferably an elastic member.

In the process of fixing the longitudinal end of the plate spacer to the first substrate, preferably, a tension acting along the length of the plate spacer is loaded on the plate spacer in advance.

According to the method for manufacturing an image display device of the invention, after the plate spacer has been fixed to the first substrate, the first substrate is carried and then the bonding process is performed. During the carriage, the plate spacer is supported with a space between the center of the plate spacer and the first substrate, thus preventing bonding with the center of the spacer displaced from the initial assembly position.

Further objects, features and advantages of the present invention will become apparent from the following description of the preferred embodiments (with reference to the attached drawings).

DESCRIPTION OF THE PREFERRED EMBODIMENTS

Embodiments of the present invention will be described hereinafter. First, a method for mounting a plate spacer to a first substrate will be described.

(Method for Mounting Plate Spacer to First Substrate)

Figure 4:
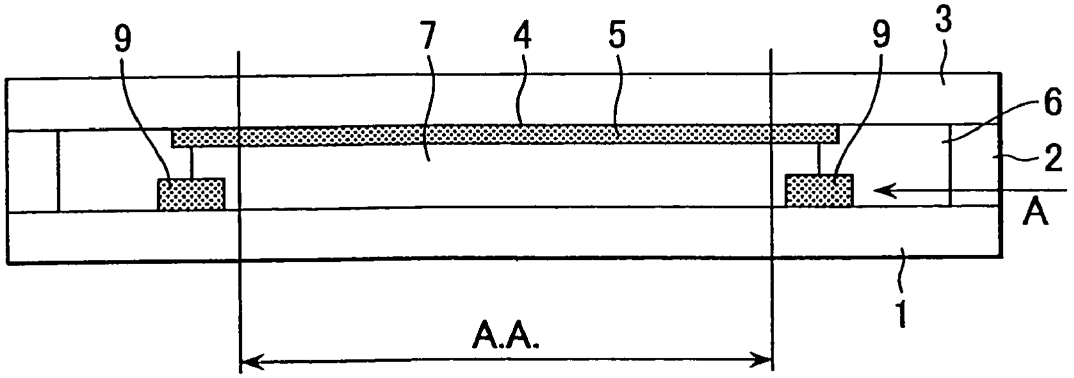
FIG. 4 (PRIOR ART)
FIG. 4 is a schematic sectional view of an image display device including a spacer.

High-accuracy alignment and assembly method of a plate spacer 7 with a first substrate (rear plate 1), as shown in FIG. 4, will be described with reference to the drawings.

Figure 5:
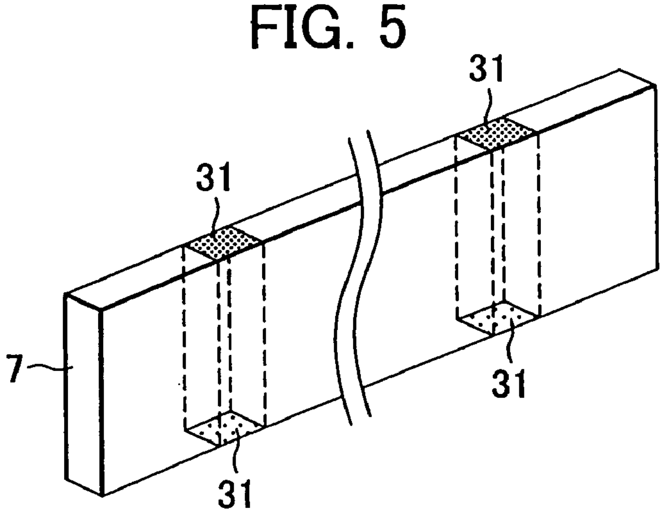
FIG. 5 is a schematic perspective view of the spacer.

FIG. 5 is a perspective view of an example of the structure of the plate spacer 7, in which marks 31 are formed in positions on the upper and lower surface of the plate spacer 7.

Figure 6:
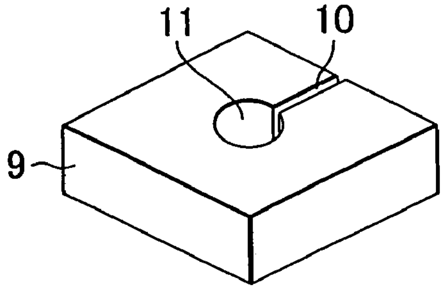
FIG. 6 is a schematic perspective view of a support member used for fastening the spacer to a substrate.

FIG. 6 shows an example of the structure of a spacer support member, in perspective view, which is used for fastening the plate spacer 7. The support member 9 has a slit 10 along the center line, with one end opened, for the plate spacer 7 to be inserted and a through-hole 11 in the deepmost part connecting thereto.

Figure 7:
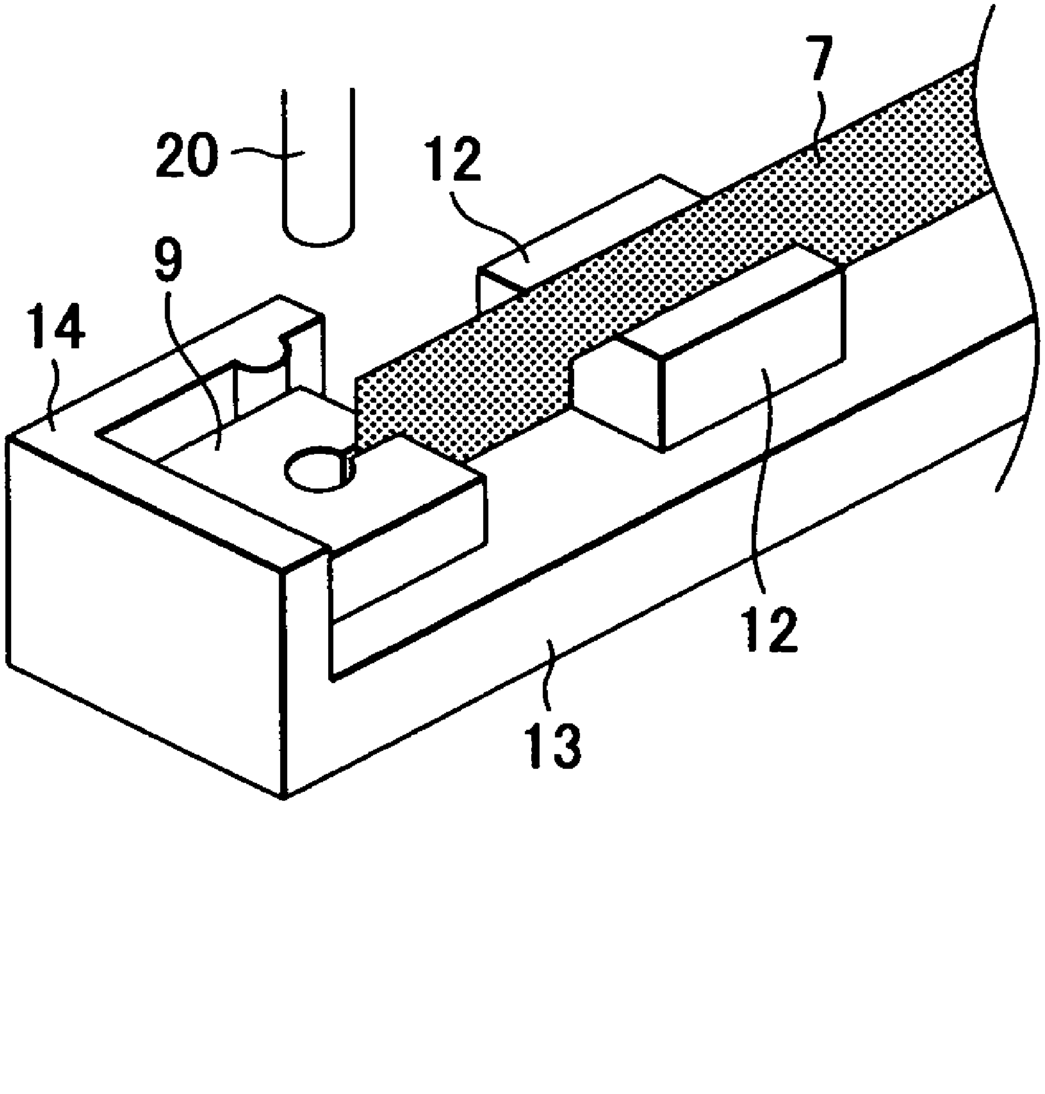
FIG. 7 is a perspective view of the structure of a device used for bonding and fastening the spacer to the support member.

FIG. 7 shows the schematic structure of a device used for bonding the spacer 7 and the support member 9 together. The device includes a spacer guide 12 for roughly alignment across the entire length of the plate spacer 7, a stage 13 for mounting the support member 9 on each end of the spacer guide 12, a support member guide 14 for alignment, and a heat gun 20.

The method for bonding the plate spacer 7 and the support member 9 will be described with reference to FIGS. 8A to 8C.

Figure 8A:
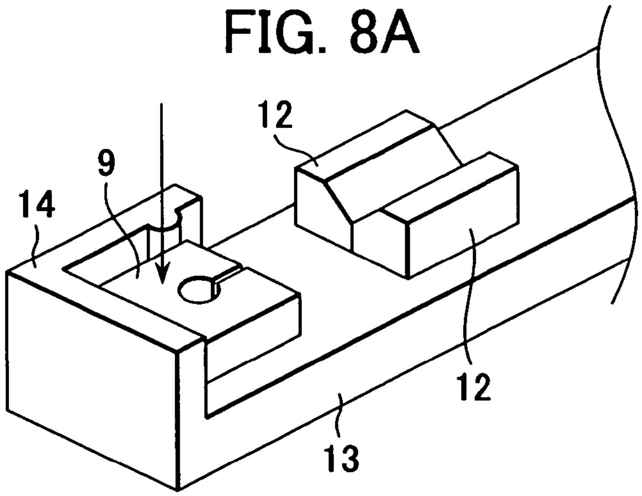
FIGS. 8A to 8C are perspective views of the procedure of bonding and fastening the spacer to the support member.

After the support member 9 is placed on the support-member mount stage 13 and is aligned by the support member guide 14, it is fixed on the support-member mount stage 13 by adsorption by negative pressure or the like (FIG. 8A).

Figure 8B:
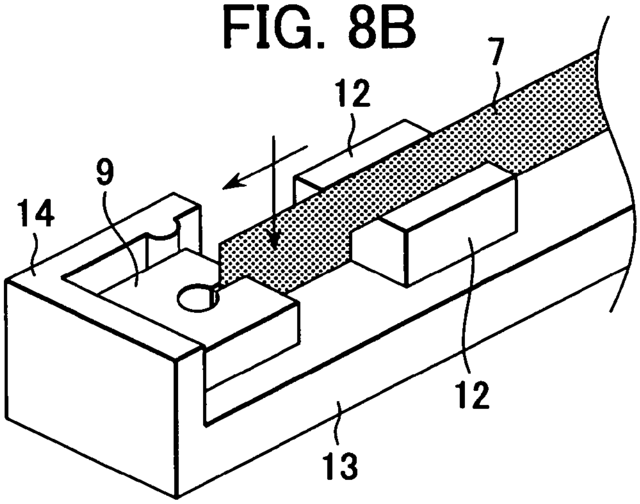

After the spacer 7 is roughly aligned by the spacer guide 12, it is fitted in the slit 10 of the support member 9 (FIG. 8B). Here, the relative positional relationship between the plate spacer 7 and the support-member mount stage 13 is adjusted so that the distance between each end of the plate spacer 7 and the through-hole 11 and the distance between the contact surface of the support member 9 with the stage 13 and the contact surface of the plate spacer 7 with the jig are each a specified value.

Figure 8C:
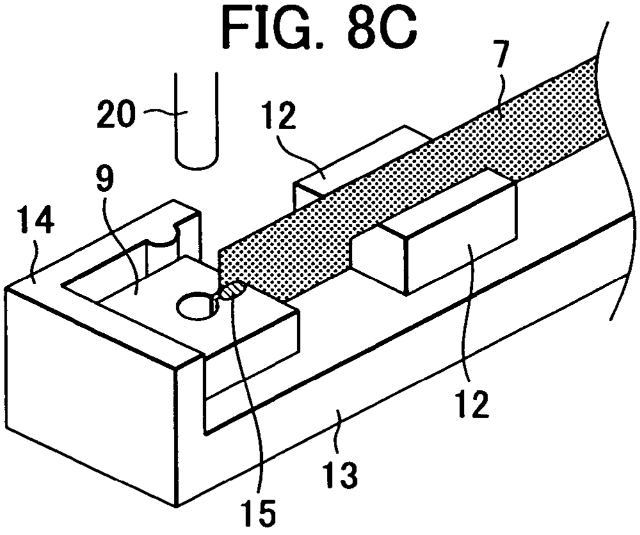

Then, an adhesive 15 is applied along the slit 10 (FIG. 8C). The adhesive 15 must not squeeze off or protrude from the contact surfaces of the plate spacer 7 with the rear plate 1 and the face plate 3. Thereafter, the adhesive 15 is thermoset by hot air using a heat gun 20 to bond and fix the plate spacer 7 and the support member 9 together with a specified positional relationship maintained.

The adhesive 15 used here has preferably less degas, such as an inorganic adhesive, because the plate spacer 7 and the support member 9 are used in a vacuum vessel finally.

The adhesive 15 is thermoset by utilizing the action that an adhesive is hardened by heat. Since the displacement between members due to heat expansion during heating and the time for heating and cooling can be reduced by limiting the heat position to a desired fixed region and its periphery, the overall adhesive-thermosetting process including this process is performed by local heating.

The profile of the heating process has two stages. First, the heat gun 20 is (temporarily) dried at about 90° C. in temperature for a specified time and is then dried finally at an increased temperature of 200° C. The reason of the two-stage processing is to prevent scattering of the adhesive to its surroundings by bumping of moisture or a volatile solvent component contained in the adhesive.

The above operations are repeated for each fixed portion to make a required number of spacers for assembling an image display device. A batch process is desirable for the repeated processes to reduce the process time.

Figure 9:
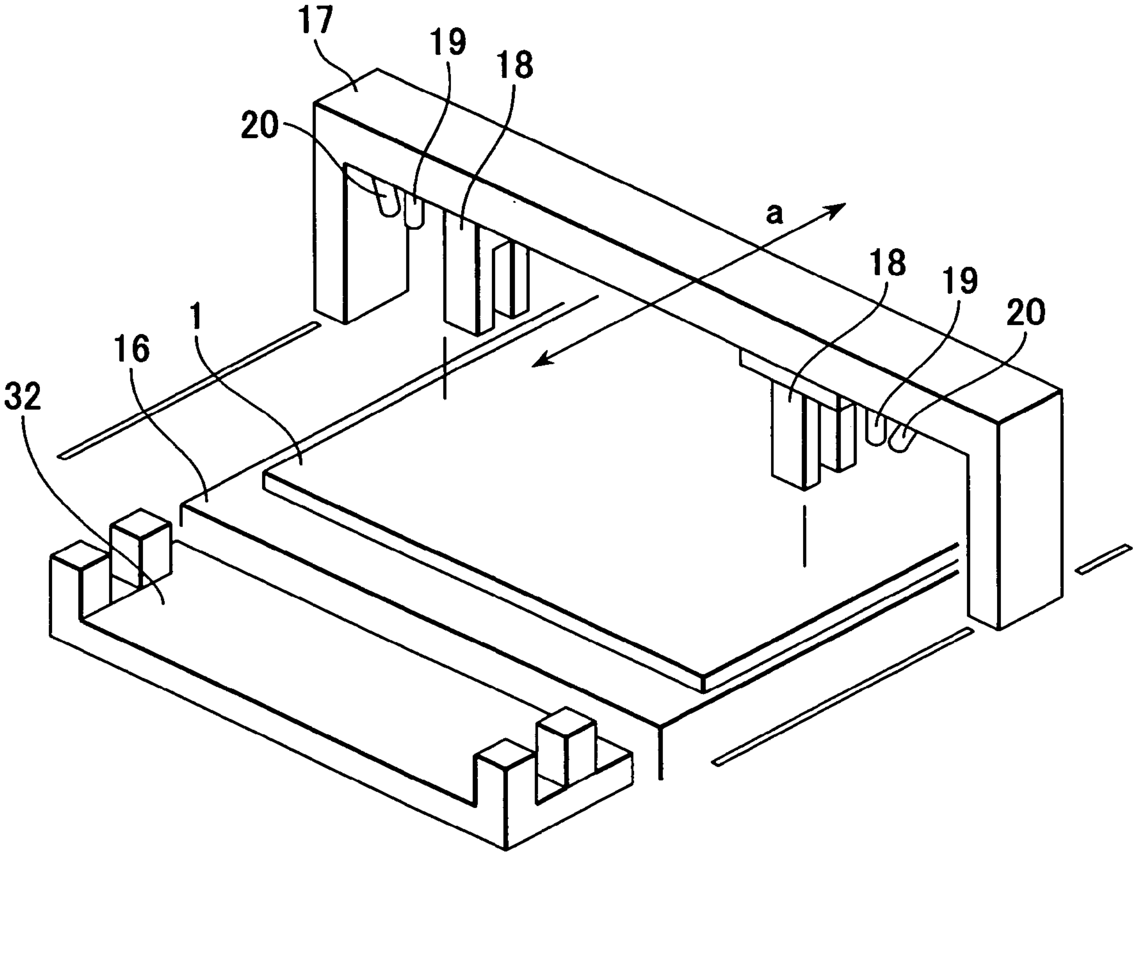
FIG. 9 is a schematic perspective view of an assembling unit of the spacer and a rear plate.

Referring now to FIG. 9, the process of joining the plate spacer 7 to the rear plate 1 will be described.

FIG. 9 shows the schematic structure of a spacer assembly device. The unit includes a measuring section 32 for measuring the thickness of the plate spacer 7 and the position of the marks 31 formed at the end faces of the plate spacer 7, and a stage 16 for mounting and fixing the rear plate 1, which are arranged in line, and a spacer carrying column 17 arranged to be movable in the direction of the arrow a in the drawing, above the measuring section 32 and the rear-plate mount stage 16.

The spacer carrying column 17 includes a spacer holder 18, a dispenser 19 for applying the adhesive 15, the heat gun 20 for hot-air drying, and a camera (not shown) for recognizing a wiring-line position and a spacer-end-mark position.

Figure 10A:
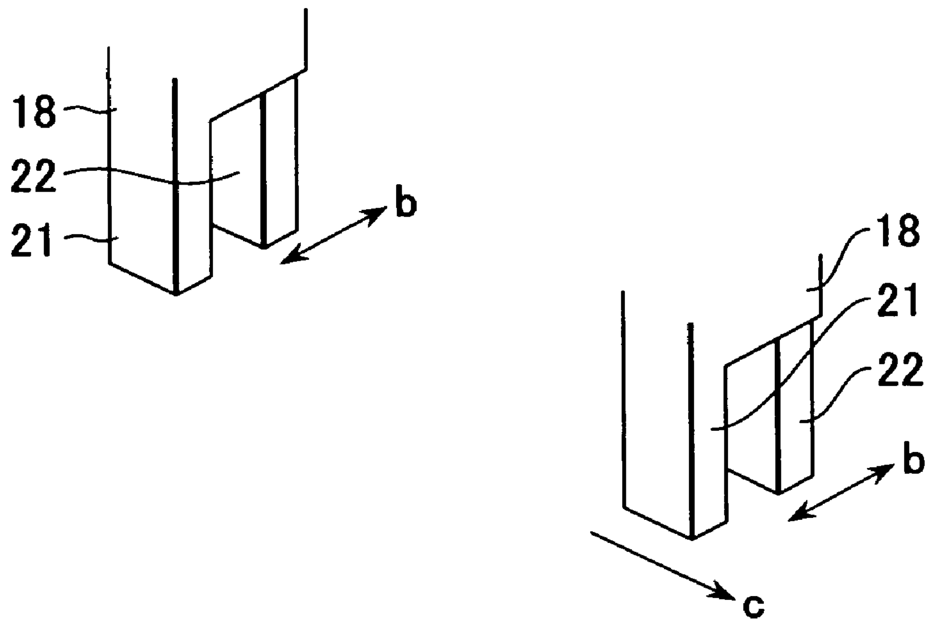
FIGS. 10A and 10B are perspective views illustrating the schematic structure and a holding operation of a spacer holder of the assembling unit of FIG. 9, respectively.
Figure 10B:
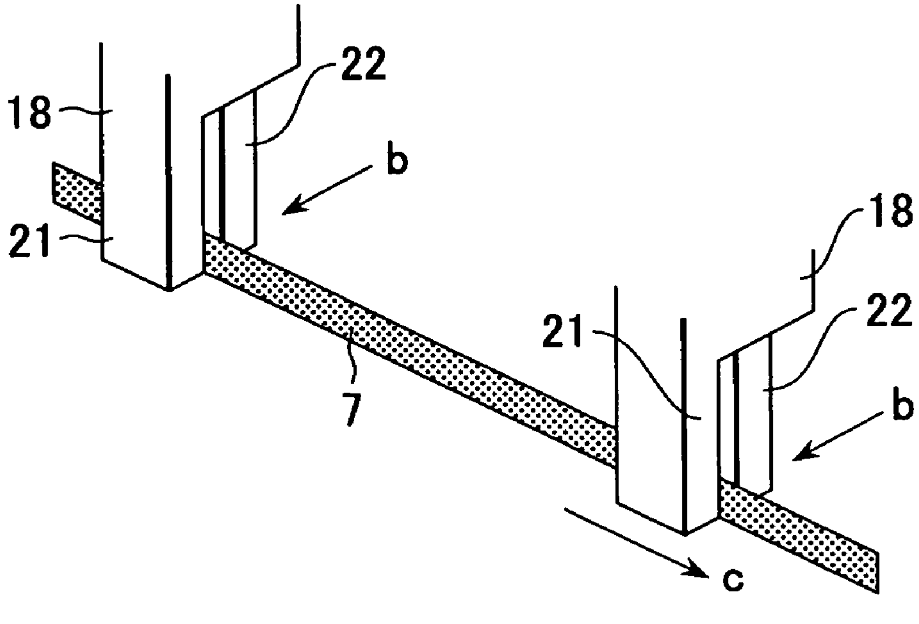

The spacer holder 18 is arranged one at each of the opposite ends of the spacer carrying column 17, two in total, which has a reference foot 21 and a movable foot 22, as shown in FIGS. 10A and 10B. The plate spacer 7 is held by moving the movable foot 22 along the arrow b in the drawing to open and close the space between the reference foot 21 and the movable foot 22. Of the two spacer holders 18, one is fixed and the other is movable along the arrow c in the drawing. After the plate spacer 7 is held by closing the space between the reference foot 21 and the movable foot 22, the movable spacer holder 18 is moved along the arrow c in the drawing (along the length of the plate spacer 7), so that the plate spacer 7 is pulled to generate tension.

Next, the alignment reference for the plate spacer 7 is set.

The plate spacer 7 is carried to the measuring section 32 while being held by the spacer holders 18 of the spacer carrying column 17 and is then placed on the stage of the measuring section 32. Here, the thickness of the plate spacer 7 and the position of the marks 31 on the end faces of the plate spacer 7 are measured.

Of the marks 31, the position of the boundary adjacent to the face plate and the outer periphery is optically measured by utilizing the difference of reflection coefficients of a mark region and a no-mark region, which is used as x-direction alignment reference (Ax) of the plate spacer 7.

Figure 11A:
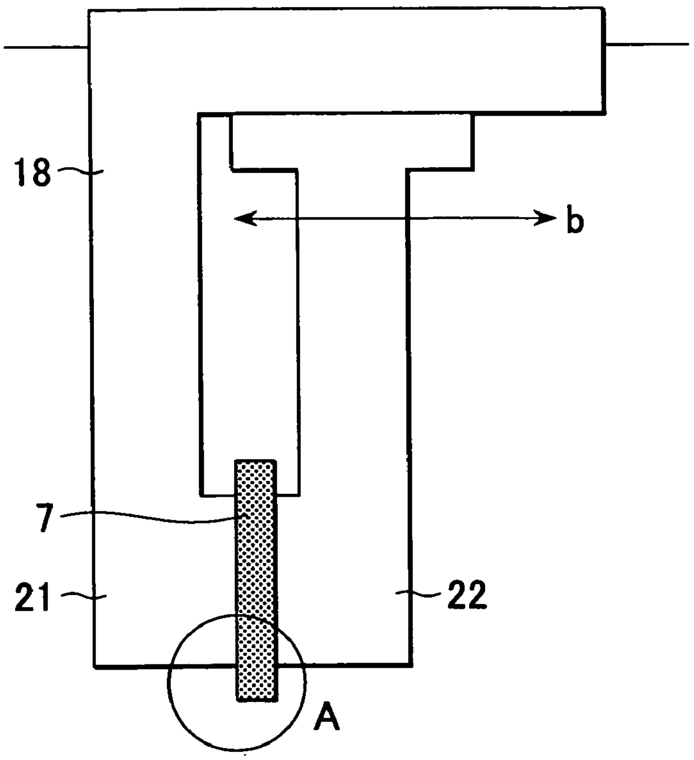
FIGS. 11A and 11B are diagrams for explaining a method for correcting an alignment position by measurement of a spacer thickness.
Figure 11B:
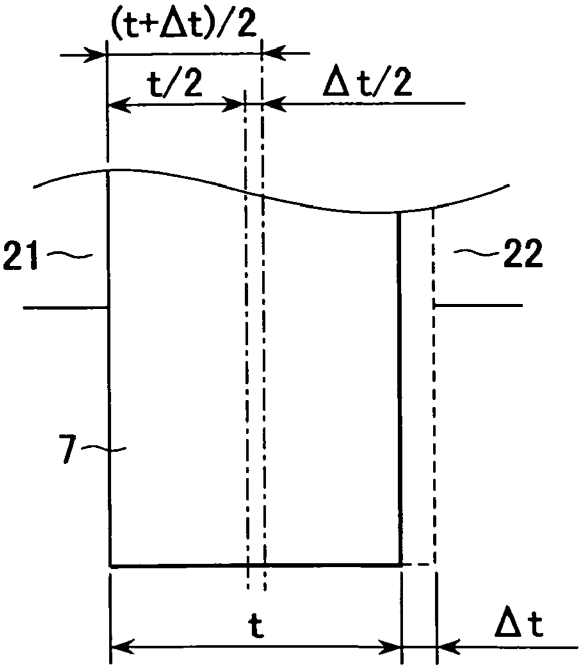

In order to use the center line in the direction of the thickness of the plate spacer 7 as the y-direction alignment reference (Ay) of the plate spacer 7, the thickness of the plate spacer 7 is mechanically or optically measured and alignment-reference correction is performed. The reason why the correction is performed will be described with reference to FIGS. 11A and 11B. FIG. 11A shows a state in which the spacer holder 18 holds the plate spacer 7 in side view. FIG. 11B shows part A of FIG. 11A, in enlarged view.

Since one foot of the spacer holder 18 of the spacer carrying column 17 is fixed and the other is movable, the thickness-direction center line of the plate spacer 7 moves with respect to the origin of the device, depending on the thickness of the plate spacer 7. Specifically, as shown in FIG. 11B for example, when the thickness is large by $\Delta t$, the thickness-direction center line of the plate spacer 7 moves toward the movable foot 22 by $\Delta t/2$. Therefore, when the plate spacer 7 is aligned with the rear plate 1, it is necessary to measure the thickness of the plate spacer 7 in advance and to calculate a correction amount, making the alignment correction for each spacer.

As described above, providing a structure in which the thickness of the spacer 7 is measured allows the difference in thickness to be corrected only by numeric correction. This can be applied to the overall assembly of the plate spacers 7 having different thicknesses (including the case of processing the plate spacers 7 that have not only manufacturing tolerances but also different thicknesses in the same process).

Figure 12:
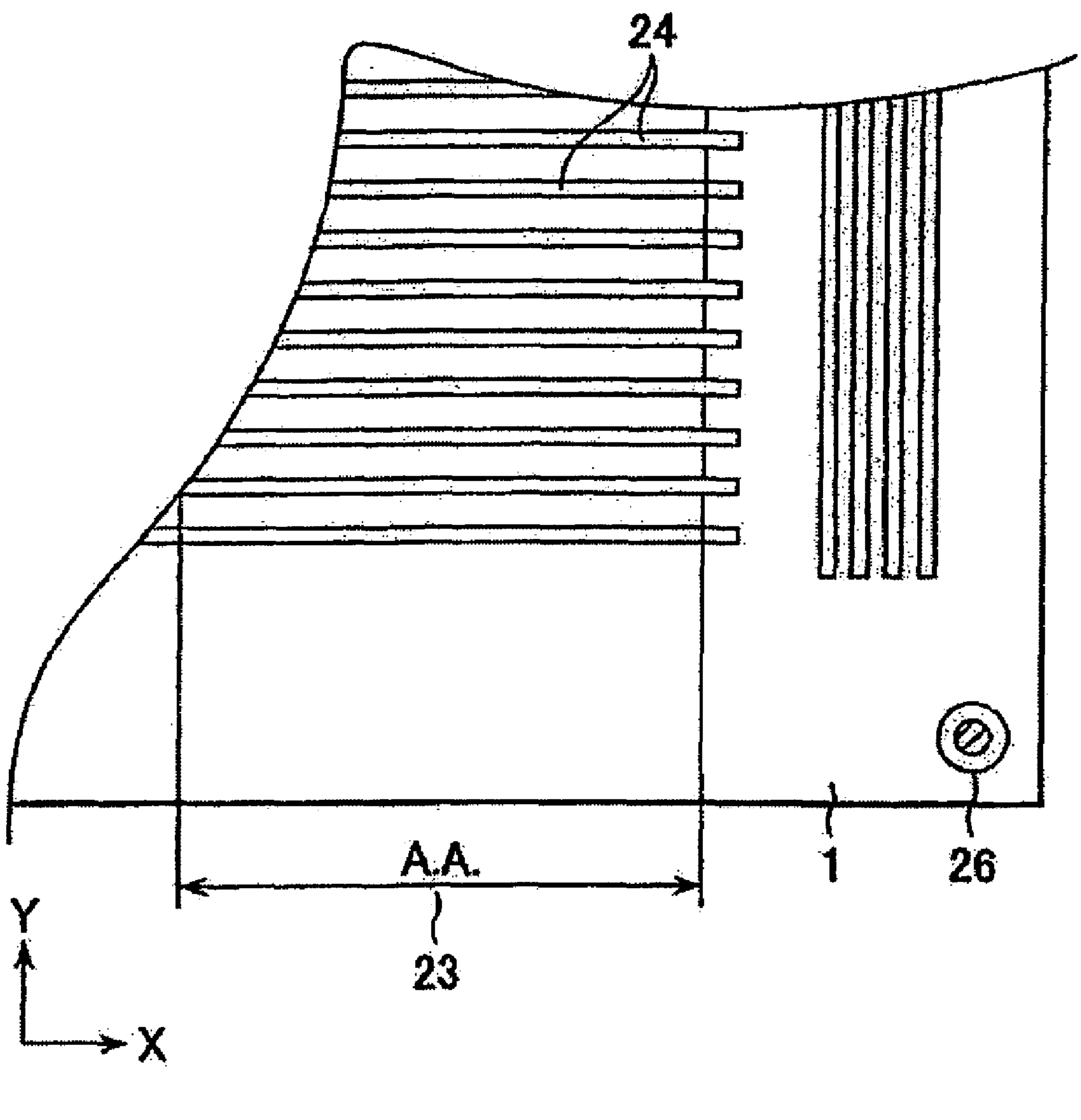
FIG. 12 is a diagram for explaining the structure of a rear plate and spacer alignment reference on the rear plate.

Referring to FIG. 12, the spacer mount surface of the rear plate 1 will be described.

A plurality of wiring lines 24 is formed in parallel to one another in an active area (A.A.) 23 on the rear plate 1. A seal mark 26 is disposed as the alignment reference for airtightly bonding the rear plate 1 and the face plate 3 together.

Figure 13:
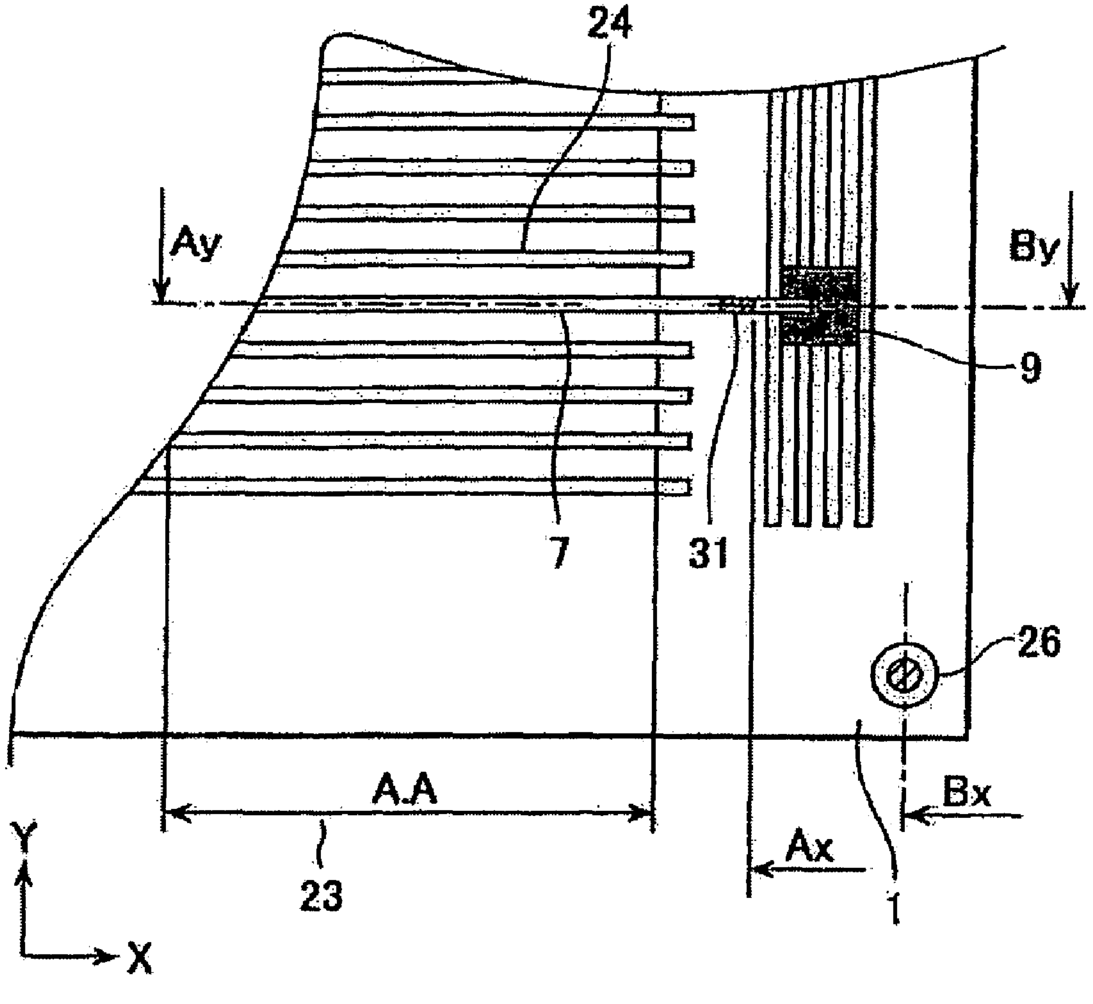
FIG. 13 is a diagram for explaining a method for setting alignment reference using an inkjet mark.

Referring to FIG. 13, the setting of the alignment reference of the plate spacer 7 on the rear plate 1 will be described.

The positions of the wiring lines 24 and the seal mark 26 are recognized using a camera and the position of the seal mark 26 is set as an x-direction alignment reference (Bx) in the drawing. Meanwhile, the line that passes through the center of the wiring lines 24 is taken out and is set as a y-direction alignment reference (By) in the drawing.

As described above, for the plate spacer 7, x-direction alignment reference (Ax): the position of the marks 31 formed on the end face of the plate spacer 7 and the y-direction alignment reference (Ay): the position of the reference foot 21+correction amount (spacer thickness/2) are set, while for the rear plate 1, the x-direction alignment reference (Bx): the position of the seal mark 26 and the y-direction alignment reference (By): the position of the line that passes though the center of the wiring lines 24 are set as the alignment reference, respectively.

Referring to FIGS. 14A to 14C and FIG. 15, the alignment and the fixation of the plate spacer 7 with the rear plate 1 will be described.

Figure 14A:
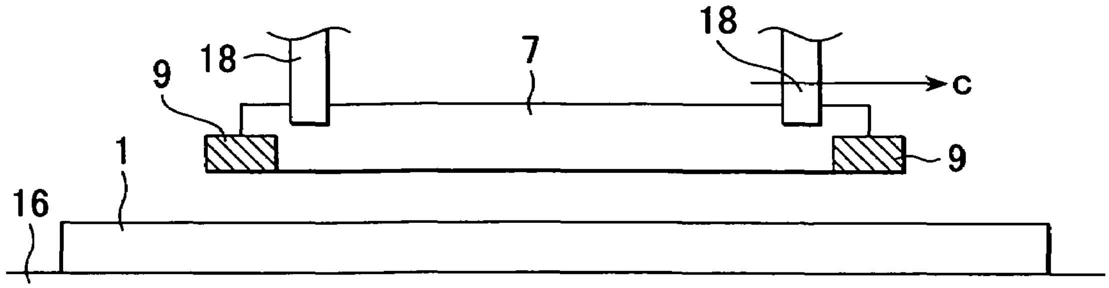
FIGS. 14A to 14C are diagrams illustrating the procedure of bonding and fixing the spacer to the rear plate.
Figure 14B:
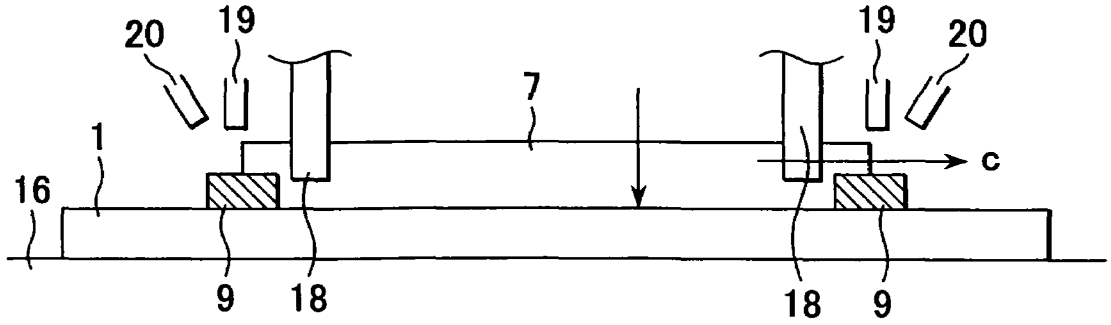

The plate spacer 7 which has been measured by the measuring section 32 is held by the spacer holders 18 and is carried from the top of the stage of the measuring section 32 to the rear plate 1 (FIG. 14A).

After the spacer carrying column 17 and the rear plate 1 have been aligned so that, for the y-direction, the alignment references of the plate spacer 7 and the rear plate 1 agree with each other and, for the x-direction, they have a specified distance therebetween, the spacer holders 18 are moved downward to push the plate spacer 7 onto the rear plate 1

(FIG. 14B), in which case when the pushing force is large, the plate spacer 7 is bent, so that the pushing force is set as small as possible. It is preferable to apply longitudinal tension (load) to the plate spacer 7 so as to move the moving-side spacer holder 18 along the arrow c in the drawing. This allows the center of the plate spacer 7 to be easily and reliably corrected to the designed initial assembly position even if it deviates therefrom.

Figure 15:
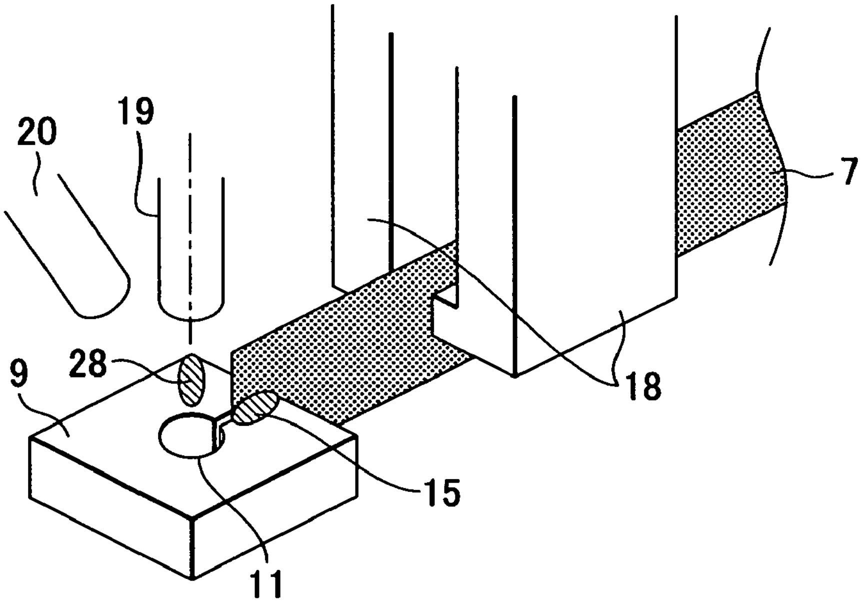
FIG. 15 is a diagram illustrating the procedure of bonding and fixing the spacer to the rear plate.

A proper amount of adhesive 28 is applied to the through-hole 11 of the support member 9 by using the dispenser 19, and the adhesive 28 is thermoset by hot air using the heat gun 20 to bond and fix the plate spacer 7 and the rear plate 1 to each other with a specified positional relationship (FIG. 15).

Figure 14C:
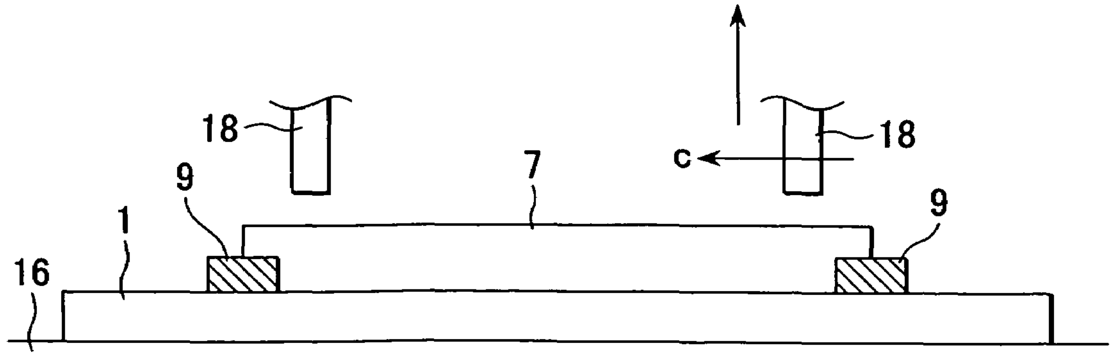

After completion of the thermosetting of the adhesive 28, the pressure of the spacer carrying column 17 is relaxed to move the movable feet 22 of the spacer holders 18 in an opening direction, thereby releasing the plate spacer 7 fixed to the rear plate 1 from the space holders 18 (FIG. 14C).

The foregoing operations are repeated to thereby bond and fix the plate spacers 7 onto the plate spacer 7 at regular intervals.

The plate spacer 7 mounted on the rear plate 1 is bonded and fixed to the rear plate 1 by the support members 9 at opposite ends, while the center of the plate spacer 7 is merely in contact with the rear plate 1 and not fixed thereto. Therefore, when an external impact is applied to the rear plate 1 having the plate spacer 7 by transfer or the like from the completion of the assembly of the plate spacer 7 and the rear plate 1 till the start of assembly of the rear plate 1 and the face plate 3, the center of the plate spacer 7 can deviate from the initial assembly position.

Accordingly, an embodiment of the present invention includes the process of forming a space between the plate spacer and the surface of the rear plate (first substrate) before the rear plate with the spacer and the face plate (second substrate) are airtightly bonded to each other. The outline of the process of forming the space will be described hereinafter.

(Process of Forming Space Between Plate Spacer and Surface of First Substrate)

The process of forming a space between the plate spacer and the surface of the first substrate is broadly divided into two: (1) the method of utilizing the deformation of the first substrate and (2) the method of utilizing the deformation of an elastic member serving as the support member 9. The typical two methods will be briefly described.

(1) Method of Utilizing Deformation of First Substrate (Rear Plate)

Figure 2A:
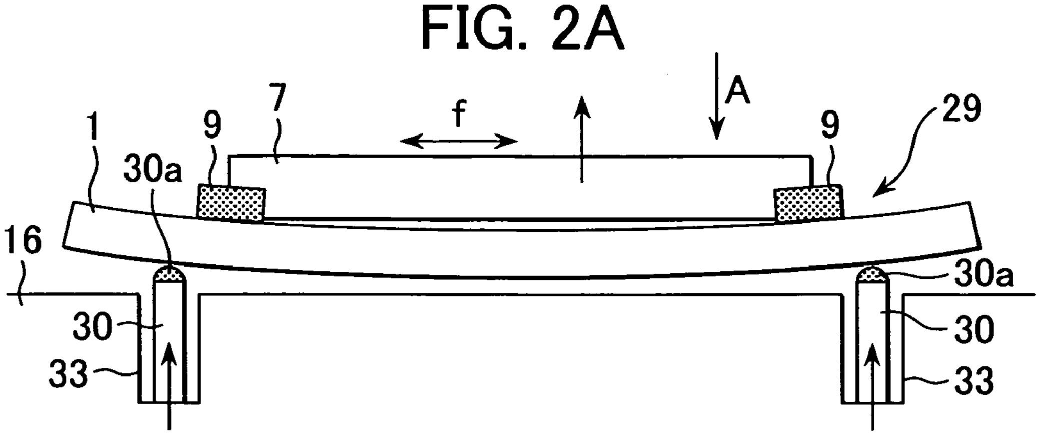
FIGS. 2A and 2B are schematic diagrams for explaining the correction of the spacer position according to the first embodiment of the invention.

When the deformation of the rear plate 1 is utilized, longitudinal tension is preferably applied to the plate spacer 7 in advance in the process of fixing the plate spacer 7 to the rear plate 1, in which case by setting the amount of reduction of the distance between the opposite ends of the plate spacer 7 due to the deformation of the rear plate 1, shown in FIG. 2A, smaller than the extending amount of the plate spacer 7 due to the tension load, the plate spacer 7 is still under the tension load after the deformation of the rear plate 1. Therefore, the center of the plate spacer 7 is surely separated from the rear plate 1, as shown in the drawing.

Since the plate spacer 7 is separated from the rear plate 1, the friction between the plate spacer 7 and the rear plate 1 is eliminated and since the plate spacer 7 is still under tension load, as described above, the plate spacer 7 again exhibits sufficient straightness at the start of assembly. When the plate spacer 7 can recover sufficient straightness by its own elasticity, there is no need to load tension along the length of the plate spacer 7.

Removing the deformation of the rear plate 1 gradually so as not to apply a dynamic load to the rear plate 1 returns the plate spacer 7 to its initial assembly position.

Making this operation before the assembly (bonding) of the rear plate 1 and the face plate 3 ensures the accuracy of the assembly position of the plate spacer 7 to the rear plate 1, irrespective of the way of handling the rear plate 1 before the assembly of the rear plate 1 and the face plate 3, and thus prevents the occurrence of beam shift and the like.

(2) Method of Utilizing Deformation of Elastic Member

The support members 9 on the opposite ends of the plate spacer 7 or another member on the contact surface of the plate spacer 7 with the rear plate 1 are made of, for example, an elastic member that is deformed by heat, such as a shape-memory alloy. The deformation of the elastic member into a specified shape under high temperature allows a space to be formed between the plate spacer 7 and the rear plate 1 and the position of the plate spacer 7 to be corrected, thus achieving accurate arrangement relationship by the action similar to that of the method (1).

According to another embodiment of the invention in which the problem of displacement of the center of the plate spacer 7 is solved, in the case where after the plate spacer 7 has been fixed to the first substrate, the first substrate is carried and the bonding process is then performed, the ends of the length of the plate spacer 7 are fixed to the first substrate, with a space formed between the center of the plate spacer 7 and the first substrate; in this case, during the carriage of the first substrate having the plate spacer 7, since the plate spacer 7 is supported with a space formed between the center of the plate spacer 7 and the first substrate, the plate spacer 7 is not carried to the bonding process with the center of the plate spacer 7 remaining in displaced position, ensuring the accuracy of assembly position of the plate spacer 7 to the rear plate 1 and thus preventing the occurrence of beam shift and the like.

After the completion of the foregoing process, the rear plate 1 and the face plate are sufficiently aligned and airtightly bonded through a frame to form the flat image-display device. The outline of the image display device according to the invention will be described hereinafter.

(Outline of Image Display Device)

Figure 29:
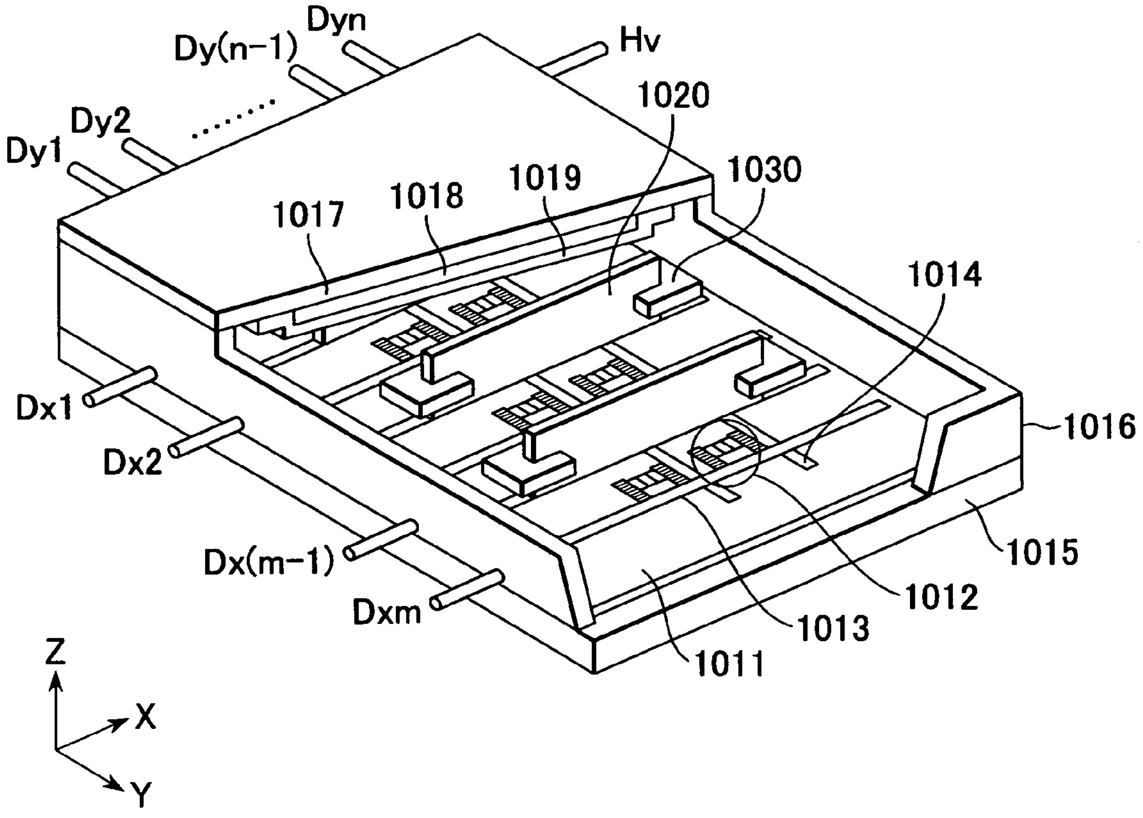
FIG. 29 is a schematic perspective view of an image display device having a spacer.

FIG. 29 is a perspective view of a display panel that constitutes the image display device, illustrating part of the panel in cutout view for showing the inner structure.

A rear plate 1015, a side wall 1016, and a face plate 1017 make up an airtight container for maintaining the interior of the display panel in vacuum. In assembly of the airtight container, the joint sections of the components must be tightly bonded to have sufficient strength and airtightness, in which case, for example, they can be bonded by applying fitted glass to the joint sections and burning it in the atmosphere or a nitrogen atmosphere at 400° C. to 500° C. for more than 10 minutes. The method of evacuating the airtight container will be described later. Since the interior of the airtight container is maintained in a vacuum of about $10^{-4}$ Pa, it is provided with a spacer 1020 as an atmospheric-pressure resisting structure to prevent the breakage of the airtight container by atmospheric pressure or a sudden impact.

The rear plate 1015 has an electron source substrate 1011 fixed thereto, on which n×m cold cathode elements 1012 are formed (n and m are positive integers of 2 or more and are set appropriately depending on the number of target display pixels). For example, it is preferably to set n=3,000 and m=1,000 or more in a display device for high-definition televisions. The n×m cold cathode elements 1012 are wired in a simple matrix of m vertical wires 1013 and n transverse wires 1014. The part made of the electron source substrate 1011, the cold cathode elements 1012, the m vertical wires 1013, and n transverse wires 1014 is called a multiple-electron-beam source.

The multiple-electronic-beam source used for the image display device of the invention has no limitation on the material, shape, and manufacturing method of the cold cathode elements as long as it is one having single matrix wiring or ladder wiring. Thus, for example, surface-conduction electron-releasing elements or FE-type or MIM-type cold cathode elements can be used.

A fluorescent screen 1018 is formed under the face plate 1017. The fluorescent screen 1018, for a color display device, has the three primary colors of red, green, and blue fluorescent substances which are used in the field of a cathode-ray tube (CRT).

Figure 30:
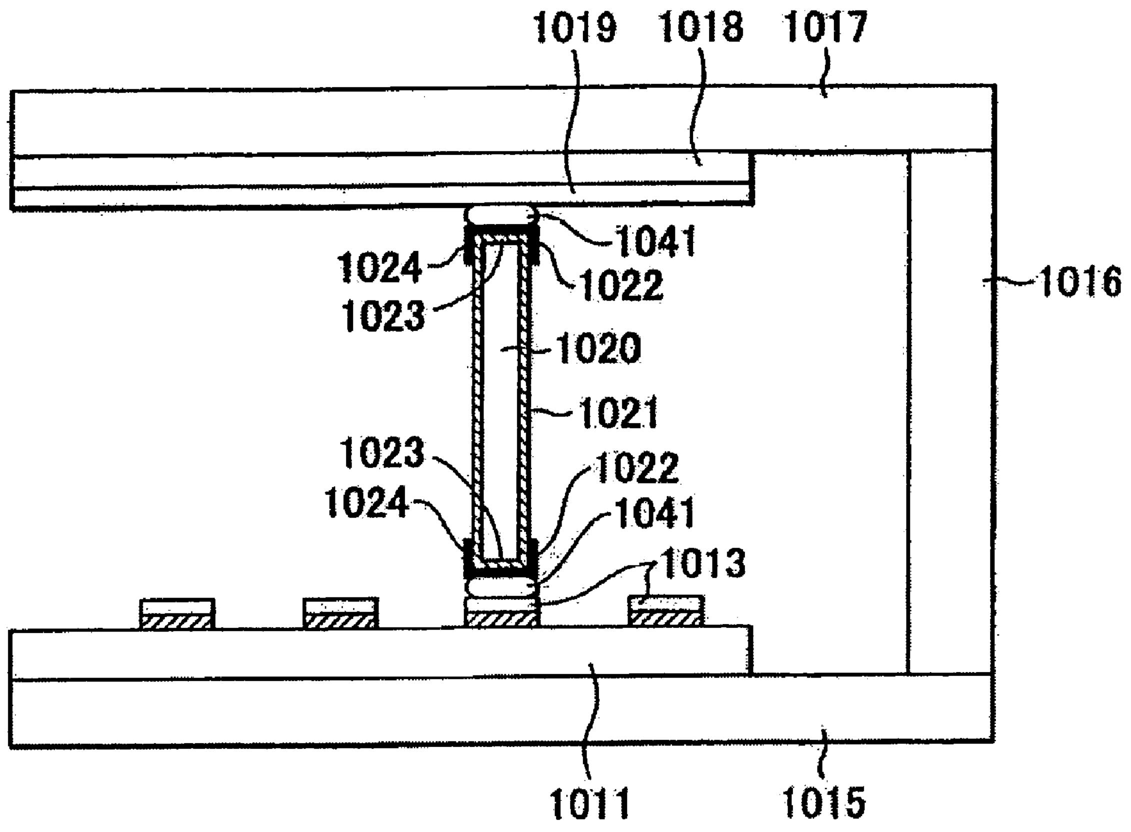
FIG. 30 is a schematic sectional view of the image display device of FIG. 29.

FIG. 30 is a schematic sectional view of the rim of the panel in FIG. 29, the numerals of the components correspond to those of FIG. 29.

The spacer 1020 is made of a member which has an antistatic high-resistance layer 1021 on the surface of an insulating member and a low-resistance layer (conductive film) 1022 on the contact surface 1023 of the spacer 1020 opposed to the inside (a metal back 1019 and so on) of the face plate 1017, the surface (the vertical wires 1013 and the transverse wires 1014) of the substrate 1011, and side faces 1024 in contact therewith. A required number of spacers 1020 to achieve the above object are arranged at a necessary distance and fixed on the inside of the face plate 1017 and the surface of the substrate 1011 with joint members 1041.

The high-resistance layer 1021 is formed at least on the surface exposed in vacuum in the airtight container, of the surface of the spacer 1020, and is electrically connected to the inside (the metal back 1019 and so on) of the face plate 1017 and the surface (the vertical wires 1013 and the transverse wires 1014) of the substrate 1011 through the low-resistance layer 1022 on the spacer 1020 and the joint members 1041.

In the embodiment described here, the spacer 1020 is shaped like a thin plate, arranged in parallel to the vertical wires 1013 and electrically connected thereto.

The spacer 1020 must have an insulating performance that can resist high voltage applied between the vertical wires 1013 and the transverse wires 1014 on the substrate 1011 and the metal back 1019 inside the face plate 1017 and also has conductivity to prevent electrical charges on the surface of the spacer 1020.

To the high-resistance layer 1021 of the spacer 1020 flows a current that is given by dividing an acceleration voltage Va applied to the high-potential face plate 1017 (the metal back 1019 and so on) by a resistance Rs of the high-resistance layer 1021 that is an antistatic coating. Therefore, the resistance Rs is set within a desired range in view of electrification prevention and power consumption. A surface resistance R/sq. is preferably at most $10^{14}$ Ω in view of electrification prevention and, more preferably, at most $10^{13}$ Ω in order to obtain sufficient electrification prevention effect. The lower limit of the surface resistance depends on the shape of the spacer 1020 and the voltage applied between the spacers 1020, which is preferably at least $10^{7}$ Ω.

The thickness t of the high-resistance layer 1021 is preferably within the range from 10 nm to 1 μm and, more preferably, from 50 nm to 500 nm. A thin film of 10 nm or less is generally formed in island shape, having unstable resistance and less reproducibility, which depends on the surface energy fo the material, the tightness with the substrate, and substrate temperature. Meanwhile, those with the thickness t of 1 μm or more have larger membrane stress to increase the possibility of peeling-off and take a long time for growing, resulting in low productivity.

The surface resistance R/sq. is ρ/t. The specific resistance ρ p of the high-resistance layer 1021 ranges preferably from 10 Ωcm to $10^{10}$ Ωcm in accordance with the preferable ranges of R/sq. and t described above. More preferably, ρ ranges from $10^{4}$ Ωcm to $10^{8}$ Ωcm to achieve more preferable surface resistance and membrane thickness.

The spacer 1020 increases in temperature by a current flowing in the antistatic coating (high-resistance layer 1021) formed thereon or by the whole display generating heat during operation. When the temperature coefficient of resistance (TCR) of the antistatic coating is a large negative value, the resistance decreases with increasing temperature to increase the current flowing in the spacer 1020, thereby increasing the temperature. The current continues to increase beyond the limit of the power source. The conditions of the occurrence of current runaway are characterized by the temperature coefficient of resistance which will be defined by the following general formula (ξ):

$$TCR = \Delta R/\Delta T/R \times 100[\%/°\ C.] \qquad \text{General Formula } (\xi)$$

where ΔT and ΔR are increments of the temperature T and resistance R of the spacer 1020 in action relative to room temperature, respectively.

The condition of the occurrence of current runaway is empirically at most −1[%/° C.] for the TCR. In other words, the temperature coefficient of resistance of the antistatic coating is preferably at least −1[%/° C.].

The materials of the high-resistance layer 1021 having an electrification prevention property include metallic oxides. Of the metallic oxides, chromium, nickel, and copper oxides are preferable. The reason is that these oxides have relatively low secondary-electron releasing efficiency, thus becoming hardly charged even when electrons released from the cold cathode elements 1012 strike against the spacer 1020. Carbon is also preferable because of its low secondary-electron releasing efficiency as well as the metallic oxides; particularly, amorphous carbon has high resistance, and so easily controls the spacer resistance to a desired value.

As other materials for the high-resistance layer 1021 having an electrification prevention property, a nitride of a germanium-transition-metal alloy and a nitride of an aluminum-transition-metal alloy are preferable since the resistance can be controlled in a wide range from good conductors to insulators by controlling the composition of the transition-metal alloys. They have a small change in resistance during the process of manufacturing a display device, as will be described later, being stable materials. Furthermore, they have a temperature coefficient of resistance larger than −1[%° C.], thus being easily used in practice. The transition-metal elements include tungsten, titanium, chromium, and tantalum. The alloy nitride coating is formed on an insulating member by thin-film coating means such as sputtering, reactive sputtering in a nitrogen gas atmosphere, electron-beam evaporation, ion plating, and ion-assist evaporation. The metallic oxide coating can also be formed by the similar thin-film coating method, in which case an oxygen gas is used in place of the nitrogen gas. The metallic oxide coating can also be formed by chemical-vapor deposition (CVD) and alcoxide coating. The carbon coating can be formed by evaporation, sputtering, CVD, and plasma CVD, and particularly, amorphous carbon is formed in an atmosphere containing hydrogen or by using a hydrocarbon gas as a deposition gas.

Referring to FIG. 29, reference symbols Dx1 to Dxm, Dy1 to Dyn, and Hv are electrical connection terminals of the airtight structure which are provided to electrically connect the display panel with electric circuits (not shown).

The terminals Dx1 to Dxm connect electrically to the vertical wires 1013 of the multiple-electronic-beam source, the terminals Dy1 to Dyn connect to the transverse wires 1014 of the multiple-electronic-beam source, and the terminal Hv connects to the metal back 1019 of the face plate 1017.

In order to evacuate the interior of the airtight container, after assembly of the airtight container, an exhaust pipe and a vacuum pump (both are not shown) are joined together, the interior of the airtight container is evacuated to a vacuum of about $10^{-5}$ Pa, and thereafter the exhaust pipe is sealed. In order to maintain the vacuum of the airtight container, a getter coating (not shown) is formed in position in the airtight container immediately before and after the sealing. The getter coating is formed by evaporating a getter material having barium as a main component with a heater or by high-frequency heating. The interior of the airtight container is maintained in a vacuum of $10^{-3}$ Pa to $10^{-5}$ Pa by the adsorption of the getter coating.

In the image display device that uses the display panel described above, when voltage is applied to each cold cathode element 1012 through the ex-container terminals Dxl to Dxm and Dyl to Dyn, electrons are released from the cold cathode elements 1012, and at the same time, high voltage of hundreds of volts to several kilovolts is applied to the metal back 1019 through the ex-container terminal Hv to accelerate the released electrons to strikes them against the inner surface of the face plate 1017. This excites the respective color fluorescent substances of the fluorescent screen 1018 to emit light, thereby displaying an image.

When a surface-conduction electron-releasing element is used as the cold cathode element 1012, the voltage applied to the cold cathode element 1012 is about 12 V to 16 V, the distance d between the metal back 1019 and the cold cathode element 1012 ranges from about 0.1 mm to 8 mm, and the voltage between the metal back 1019 and the cold cathode element 1012 ranges from about 0.1 kV to 10 kV.

Up to this the outline of the image display device of the invention has been described.

EXAMPLES

While examples of the present invention will be described hereinafter, it is to be understood that the invention is not limited to those.

First Example

In this example, a first substrate (rear plate) with a spacer is deformed to thereby form a space between the spacer and the surface of the rear plate, correcting the position of the spacer by the space, and thus realizing a correct arrangement relationship.

FIG. 1A to FIG. 3B are schematic diagrams for explaining the process of forming a space between the plate spacer 7 and the surface of the rear plate 1 in this example. The example will be described with reference to FIGS. 1A to 3B.

A plurality of the plate spacers 7 is bonded and fixed onto the rear plate 1 at regular spaces with tension loaded along the length of the spacer 7.

Figure 1A:
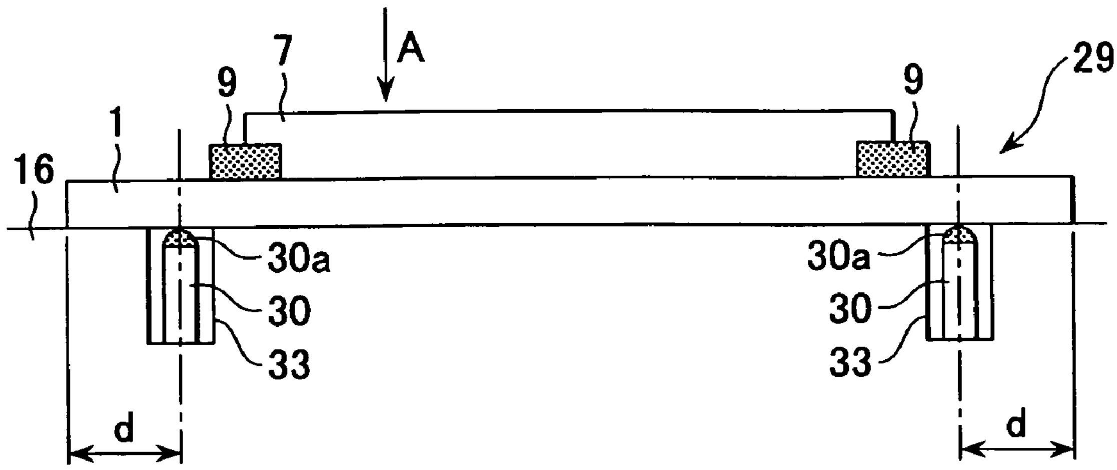
FIGS. 1A and 1B are schematic diagrams for explaining the correction of a spacer position according to a first embodiment of the present invention.
Figure 1B:
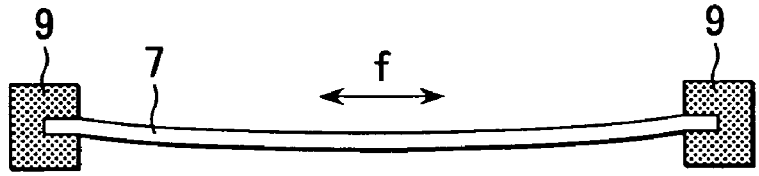

When an external impact and so on are applied to the rear plate 1 having the plate spacer 7 due to transfer or the like after the completion of assembly of the plate spacer 7 and the rear plate 1 until the start of assembly of the rear plate 1 and the face plate 3, as described above, the center of the plate spacer 7 may sometimes deviate from the initial assembly position, as shown in FIG. 1B, because it is merely in contact with the rear plate 1 and not fixed thereto.

Therefore, first, a rear plate 29 having the plate spacer 7 was placed on the rear plate stage 16 (FIG. 1A).

To the rear stage 16, support members 30 are arranged in the position that is substantially parallel to two sides perpendicular to the length of the plate spacer 7, of the four sides of the rear plate 29 with the plate spacer 7, and distance d apart from the two sides.

The support member 30 is formed of an indentor 30*a* in contact with the lower surface of the rear plate 1 and a driving means (not shown) for elevating the indentor 30*a* and stopping it in position, which is generally housed in a recess 33 formed in the rear plate stage 16 such that the contact surface of the indentor 30*a* with the rear plate 1 is flush with or lower than the upper surface of the rear plate stage 16.

Referring now to FIG. 2A, the support member 30 was moved upward to bring the indentor 30*a* into contact with the lower surface of the rear plate 1, thereby lifting the rear plate 1. When the rear plate 1 has been fully separated form the rear plate stage 16, the support member 30 was stopped.

At that time, the rear plate 1 is curved/deformed such that the upper surface (spacer-fixing side) becomes concave. In this example, the rear-plate supporting position (the position of the support member 30) was set in the position where the reduction along the length of the plate spacer 7 due to the deformation is smaller than the extension due to tension (the arrow f in the drawing) that was applied to the plate spacer 7 in advance.

Figure 2B:
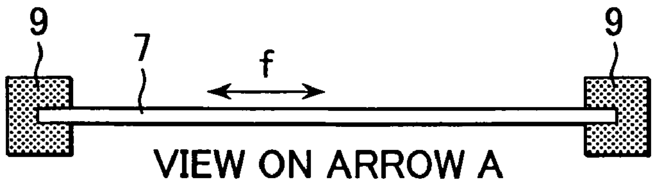

Therefore, the longitudinal tension was still applied to the plate spacer 7 after the rear plate 1 had been curved/deformed, so that the center of the plate spacer 7 was separated from the rear plate 1 to exhibit sufficient straightness as in the beginning of assembly again, as shown in FIG. 2B.

Figure 3A:
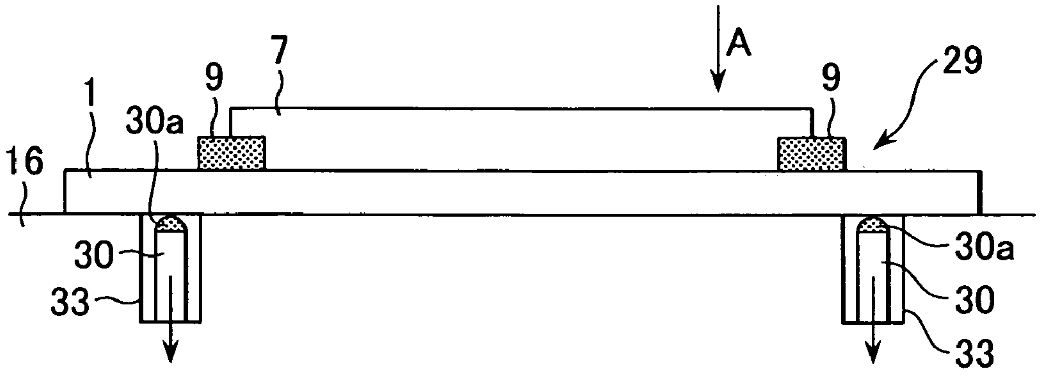
FIGS. 3A and 3B are schematic diagrams for explaining the correction of the spacer position according to the first embodiment of the invention.
Figure 3B:
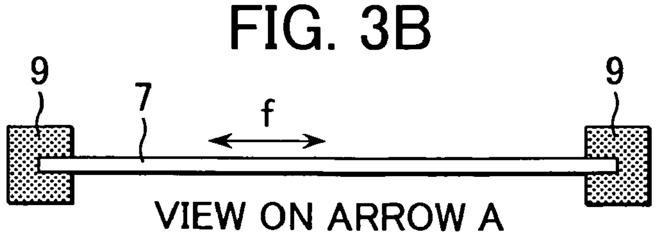

Referring to FIG. 3A, the support member 30 was moved downward so as not to apply a dynamic load to the rear plate 1 to thereby mount the rear plate 1 on the rear plate stage 16 again.

For the method of driving down the support member 30 so as not to apply a dynamic load to the rear plate 1, it is necessary to take into consideration low acceleration, low-speed operation, and the relaxing of impact acceleration with a dashpot in order to eliminate the inertia force to the rear plate 1 and the plate spacer 7 generated by sharp acceleration or deceleration during the descending of the support member 30.

After the correction of the position of the plate spacer 7, described above, the rear plate 1 and the face plate were tightly bonded to form an airtight container (display panel), as shown in FIG. 4.

Forming a space between the spacer and the substrate before bonding, as described above, allows the correction of the spacer setting position, preventing a bad influence on the image display device due the deviation of the spacer setting position, thus providing a favorable image display.

Second Example

In this example, the support member on opposite ends of the spacer was made of a member that is deformed by heat, allowing the formation of a space between the spacer and the rear plate under high temperature, correcting the position of the spacer by the space, and thus realizing an accurate arranging relationship.

The characteristics of this example for making the image display device having the structure shown in FIGS. 29 and 30 will be described hereinafter.

(Plate Spacer)

The plate spacer 1020 (refer to FIG. 30) was made of a soda-lime-glass insulating member (300 mm×2 mm×0.2 mm).

The high-resistance layer 1021 was formed on four faces exposed in the image forming region of the airtight container of the surfaces of the spacer 1020 (the front and back faces of 300 mm×2 mm and 300 mm×0.2 mm, respectively, or the faces exposed in vacuum), while the low-resistance layer 1022 was formed on two faces 1023 in contact with the respective image forming regions of the face plate 1017 and the rear plate 1015.

For the high-resistance layer 1021, a chromium-aluminum alloy nitride layer (200 nm in thickness, about $10^9$ Ω/sq.) was used which was formed by simultaneously RF-sputtering target materials, chromium and aluminum.

The low-resistance layer 1022 was formed on the image forming region for the purpose of electrical connection between the high-resistance layer 1021 of the spacer 1020 and the face plate 1017 and between the high-resistance layer 1021 and the rear plate 1015 (in this example, the vertical wires 1013 on the electron source substrate 1011 are bonded and fixed on the rear plate 1015) and also for the purpose of restraining the electric field around the spacer 1020 to control the path of electronic beams from the electron-releasing elements.

(Spacer-Support Member)

Figure 16:
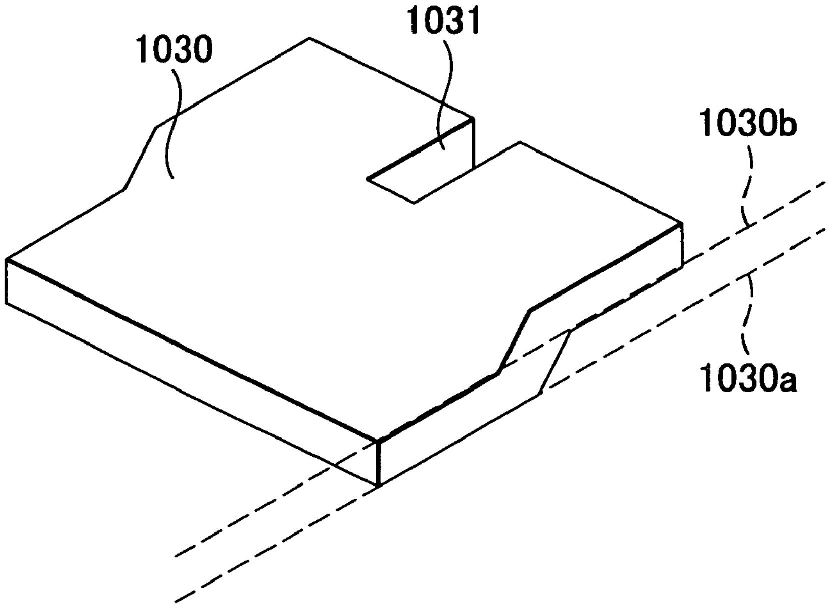
FIG. 16 is a schematic diagram of a spacer support member according to a second embodiment of the invention.

The material of the spacer-support members 1030 fixed to opposite ends of the spacer 1020 includes a shape-memory alloy and bimetal. As shown in FIG. 16, it measured 5 mm×5 mm×0.5 mm (height) and had a slit 1031 (0.25 mm in width) with a length of 2 mm in the center, in which the spacer 1020 is fit.

The spacer-support member 1030 was deformed under high temperature to move a face 1030*a* including a face of the spacer-support member 1030 and the face opposed to the spacer-mount surface of the rear plate 1015 into the position of a face 1030*b*.

The material of the spacer-support member 1030 is not limited to that of this example and may be stainless steel or an alloy mainly composed of nickel and iron. The characteristics required for the spacer-support member 1030 include a thermal expansion coefficient close to those of the spacer 1020 and the substrate.

(Assembling Spacer and Spacer-Support Member)

Figure 17:
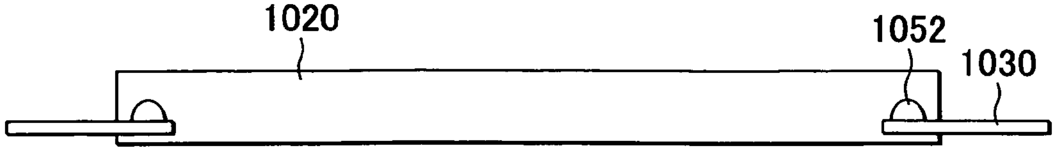
FIG. 17 is a diagram illustrating the state in which the support member is bonded to the spacer according to the second embodiment of the invention.

Referring to FIG. 17, the opposite ends of the spacer 1020 were fitted into the slits 1031 (0.25 mm in width and 2 mm in length) in the center of the spacer-support members 1030 and each fixed with a first joint member 1052.

(Mounting Spacer to Rear Plate)

The spacer 1020 was aligned by a spacer assembling unit in the center of the vertical wires 1013 in the electron-beam releasing region of the rear plate 1015 so as to be perpendicular to the surface of the rear plate 1015, and the spacer-support members 1030 joined to the opposite ends were each fixed on the rear plate 1015 with a second joint member 1053. Also in this example, the plurality of spacers 1020 was fixed on the rear plate 1015 with longitudinal tension loaded thereto, in accordance with the procedure in the description of the embodiments of the invention.

(Bonding Rear Plate to Face Plate)

Thereafter, the side walls 1016 were placed on the rear plate 1015 through fritted glass (not shown) and the contact surfaces of the side walls 1016 with the face plate 1017 were also coated with fritted glass. The face plate 1017 has, on the inner surface, the fluorescent screen 1018 formed of stripe-shaped color fluorescent substances which extend in the Y-direction and the metal back 1019.

Figure 18A:
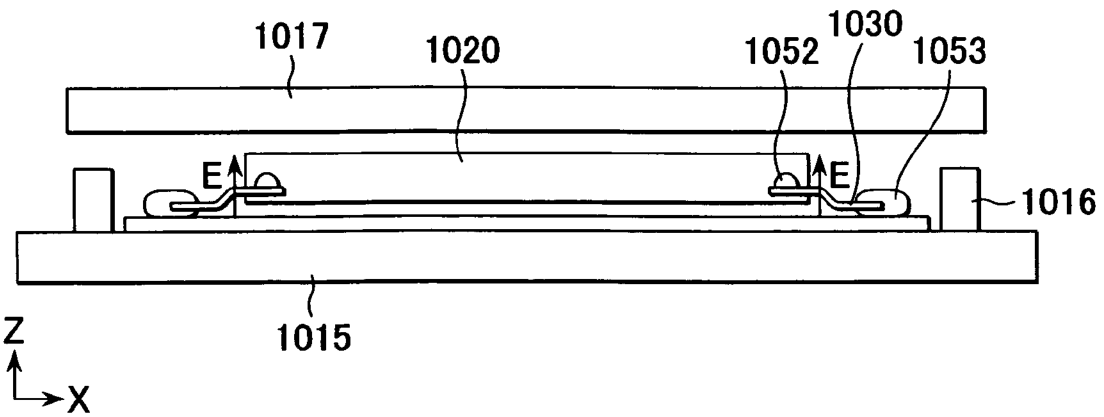
FIGS. 18A and 18B are diagrams for explaining a process of airtightly mounting a panel according to the second embodiment.

The face plate 1017 and the rear plate 1015 were each heated to 400° C. to 500° C. At that time, as shown in FIG. 18A, the fixing parts of the spacer 1020 and the spacer-support members 1030 were moved along the thickness of the rear plate 1015, or the arrow E in the drawing, so that the spacer 1020 was arranged at a distance above the rear plate 1015. In this way, the spacer 1020 was aligned in a proper position.

Figure 18B:
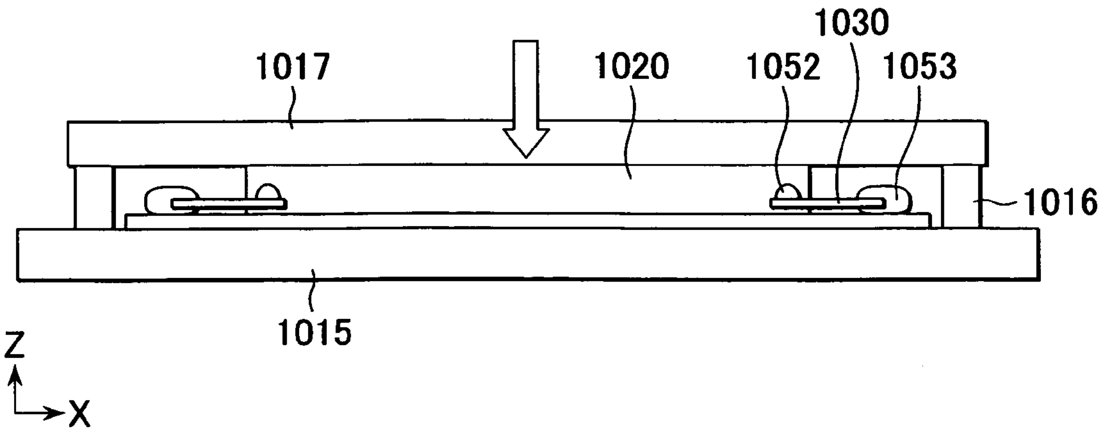

Subsequently, the rear plate 1015 and the face plate 1017 were opposed to each other such that the surface of the rear plate 1015 which has the electron source is upward and the surface of the face plate 1017 adjacent to the metal back 1019 is downward. They were brought close to each other horizontally, and the spacer 1020 arranged at a distance above the rear plate 1015 was pushed by the metal back 1019 of the face plate 1017 to clamp the spacer 1020 with the rear plate 1015 and the face plate 1017 (FIG. 18B).

The interior of the airtight container thus completed was evacuated by a vacuum pump through an exhaust pipe, and after it had been fully evacuated, the surface-conduction electron-releasing elements were supplied with electricity through the ex-container terminals Dx1 to Dxm and Dy1 to Dyn and the vertical wires 1013 and the transverse wires 1014 for electrical forming and activation which are generally performed in the process of manufacturing surface-conduction electron-releasing elements.

The exhaust pipe (not shown) was welded in a vacuum of about $10^{-4}$ Pa by heating with a gas burner to seal the package (airtight container). Finally, a getter process was performed to maintain the vacuum after the sealing.

In the image forming device thus completed, the cold cathode elements (surface-conduction electron-releasing elements) 1012 emit electrons through the application of scanning signals and modulation signals by a signal generating means (not shown) through the ex-container terminals Dx1 to Dxm and Dy1 to Dyn; high voltage was applied to the metal back 1019 through the high-voltage terminal Hv to accelerate the released electron beams, striking the electrons against the fluorescent screen 1018 to excite the fluorescent substances to emit light, thereby displaying an image. The voltage Va applied to the high-voltage terminal Hv was set from 3 kV to 10 kV and the voltage Vf applied between the wires 1013 and 1014 was set at 14 V.

Also in this example, the position of the spacer is corrected by the formation of a space between the spacer and the substrate, preventing a bad influence to the image display device, allowing a favorable image display.

Third Example

In this example, the structural component below the spacer was made of a thermal deformation member, allowing the formation of a space between the spacer and the rear plate under high temperature, correcting the position of the spacer by the space, and thus realizing an accurate arrangement relationship.

The characteristics of this example for making the image display device having the structure shown in FIGS. 29 and 30 will be specifically described hereinafter.

(Structural Component)

Figure 19:
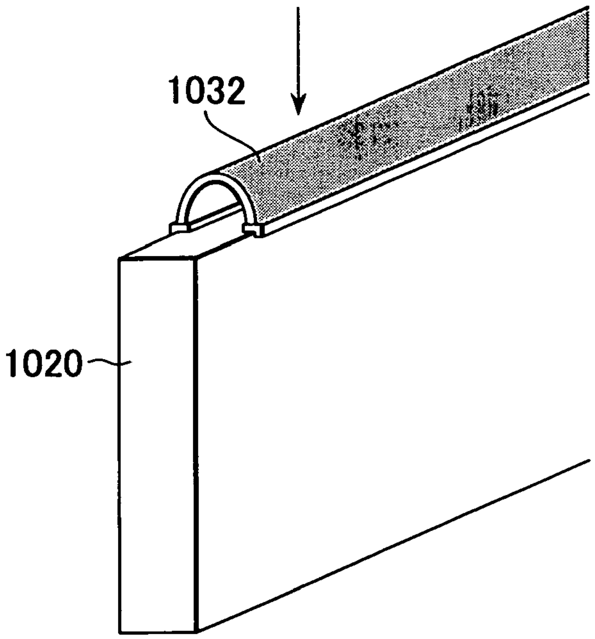
FIG. 19 is a diagram illustrating a state in which a structural element is bonded to a spacer according to a third embodiment of the invention.

FIG. 19 shows a state in which a structural component 1032 is mounted to the spacer 1020. The structural component 1032 was made of a shape-memory alloy or bimetal, which was fitted on or bonded to the rear-plate mount surface of the spacer 1020 with an inorganic adhesive. The structural component 1032 is reduced in size along the arrow in the drawing under high temperature.

(Spacer-Support Member)

The spacer-support members 1030 fixed to opposite ends of the spacer 1020 measured 5 mm×5 mm×0.5 mm (height) and had the slit 1031 (0.25 mm in width) with a length of 2 mm in the center, in which the spacer 1020 is fit.

(Assembling Spacer and Spacer-Support Member)

Figure 20:
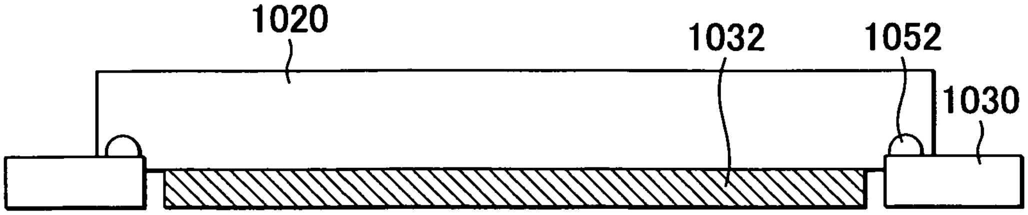
FIG. 20 is a diagram illustrating a state in which the structural element and a support member are bonded to the spacer according to the third embodiment of the invention.

Referring to FIG. 20, the opposite ends of the spacer 1020 were fitted into the slit 1031 (0.25 mm in width and 2 mm in length) in the center of the spacer-support member 1030 and each fixed with the first joint member 1052.

(Mounting Spacer to Rear Plate)

Figure 21:
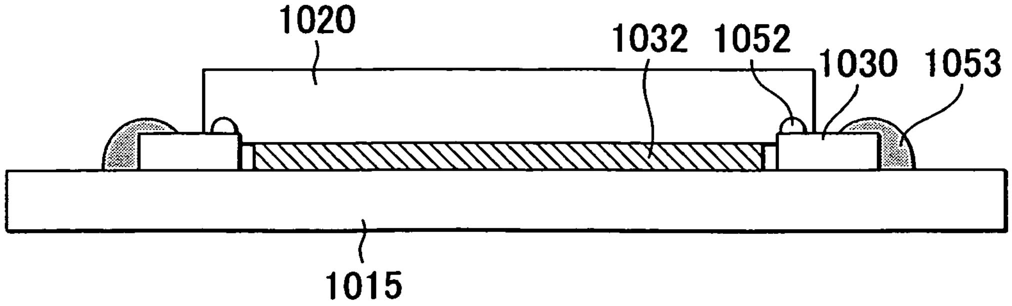
FIG. 21 is a diagram illustrating a state in which the spacer is bonded to a rear plate according to the third embodiment of the invention.

The spacer 1020 was aligned by a spacer assembling unit in the center of the vertical wires 1013 in the electron-beam releasing region of the rear plate 1015 so as to be perpendicular to the surface of the rear plate 1015 and the spacer-support members 1030 joined to the opposite ends were each fixed on the rear plate 1015 with a second joint member 1053, in which case, as shown in FIG. 21, the center of the length of the spacer 1020 was arranged such that the structural component 1032 mounted to the spacer 1020 and the rear plate 1015 are in contact with each other. Also in this example, the plurality of spacers 1020 was fixed on the rear plate 1015 with longitudinal tension loaded thereto, in accordance with the procedure in the description of the embodiments.

(Bonding Rear plate to Face Plate)

Thereafter, the side walls 1016 were placed on the rear plate 1015 through fritted glass (not shown) and the contact surfaces of the side walls 1016 with the face plate 1017 were also coated with fritted glass (not shown). On the inner surface of the face plate 1017, the fluorescent screen 1018 formed of stripe-shaped color fluorescent substances which extend in the Y-direction and the metal back 1019 are provided.

Figure 22A:
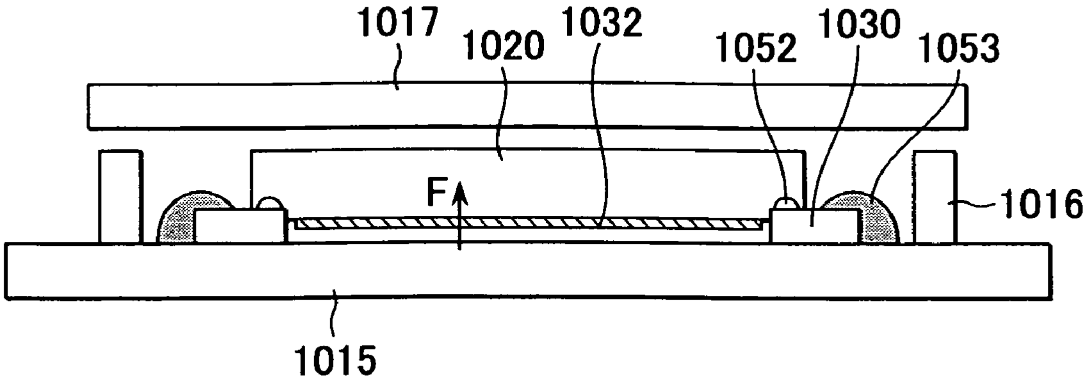
FIGS. 22A and 22B are diagrams for explaining a process of airtightly mounting a panel according to the third embodiment of the invention.

The face plate 1017 and the rear plate 1015 were heated to 400° C. to 500° C. At that time, as shown in FIG. 22A, the structural component 1032 arranged in the center of the length of the spacer 1020 was reduced in size in the direction perpendicular to the spacer mount surface of the rear plate 1015, or along the arrow F, because of high temperature, to form a space between the rear plate 1015 and the spacer 1020. In this way, the spacer 1020 was aligned in a proper position.

Figure 22B:
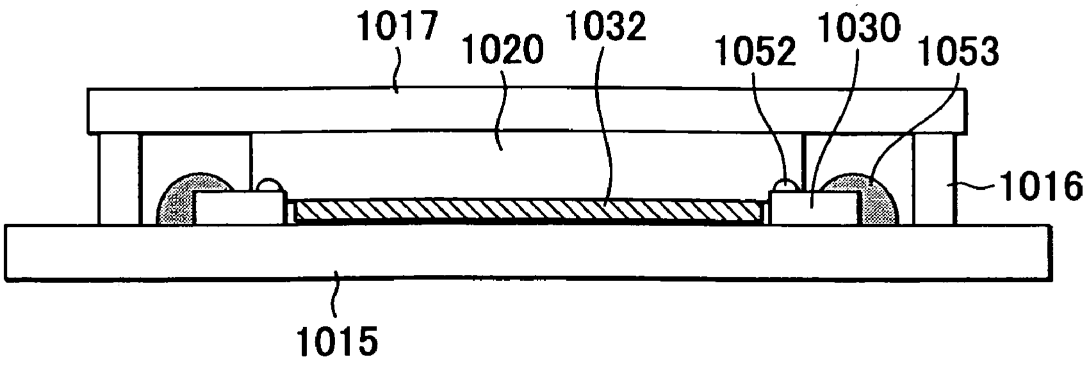

Subsequently, the rear plate 1015 and the face plate 1017 were opposed such that the surface of the rear plate 1015 which has the electron source is upward and the surface of the face plate 1017 adjacent to the metal back 1019 is downward. They were brought close to each other horizontally and tightly bonded together. The structural component 1032, which has been arranged apart from the rear plate 1015 in the center of the length of the spacer 1020, returned to its initial shape, thereby coming into contact with the rear plate 1015 as the substrate temperature returns to room temperature; thus, the spacer 1020 was clamped by the rear plate 1015 and the face plate 1017 (FIG. 22B).

Subsequent process of making the image display device is similar to that of the second example.

Also in this example, a space can be formed between the spacer and the substrate, allowing correction of the spacer to a proper position, thereby preventing a bad influence on an image by the displacement of the spacer to provide a favorable image display.

Fourth Example

In this example, the support members at the opposite ends of the spacer and the substrate were bonded together and the spacer body was not brought into contact with the substrate (a space was kept between the spacer and the substrate) until a bonding process, thereby eliminating the displacement between the spacer and the substrate which occurs during a carrying process.

The characteristics of this example for making the image display device having the structure shown in FIGS. 29 and 30 will be specifically described hereinafter.

(Spacer-Support Member)

Figure 23:
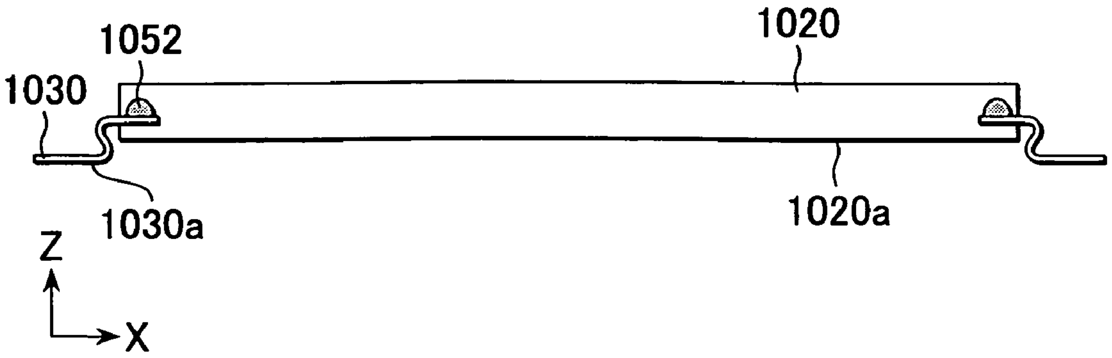
FIG. 23 is a diagram illustrating a state in which a support member is bonded to a spacer according to a fourth embodiment of the invention.

The spacer-support members 1030 fixed to opposite ends of the spacer 1020 (with the same structure as that in the second example) were made of, for example, an alloy mainly composed of nickel and iron which has a thermal expansion coefficient closer to that of the rear plate 1015. Referring to FIG. 23, it was formed of an alloy 0.1-mm thickness, 5-mm width, and 7-mm length in S-shape and had the slit 1031 (0.25 mm in width) with a length of 1.5 mm in the center of the width, in which the spacer 1020 is fit.

(Assembling Spacer and Spacer-Support Member)

Referring to FIG. 23, the opposite ends of the spacer 1020 were fitted into the slit 1031 (0.25 mm in width and 2 mm in length) in the center of the spacer-support member 1030 and each fixed with the first joint member 1052, in which case the spacer 1020 and the spacer-support member 1030 were joined such that a face 1020*a* of the spacer 1020 opposed to the rear plate 1015 and the face 1030*a* of the spacer-support member 1030 opposed to the rear plate 1015 were arranged substantially in parallel and the face 1020*a* was closer to the face plate 1017 than the face 1030*a*.

(Mounting Spacer to Rear Plate)

Figure 24:
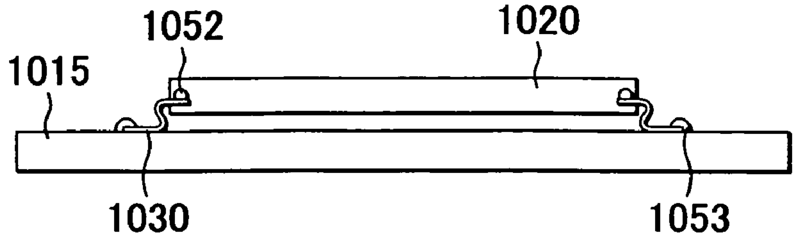
FIG. 24 is a diagram illustrating a state in which the spacer is fixed to a rear plate according to the fourth embodiment of the invention.

The spacer 1020 was aligned by a spacer assembling unit in the center of the vertical wires 1013 in the electron-beam releasing region of the rear plate 1015 so as to be perpendicular to the surface of the rear plate 1015, and the spacer-support members 1030 joined to the opposite ends in advance were each fixed on the rear plate 1015 with the second joint member 1053. Thus, the spacer 1020 was arranged apart from the rear plate 1015, as shown in FIG. 24. Thereafter, the spacer-mounted rear plate 1015 was carried to bond the rear plate 1015 and the face plate 1017 together. During the carriage, the rear plate 1015 was given an impact and vibration to change the position relative to the spacer 1020. However, since the spacer 1020 is apart from the rear plate 1015, it returned onto the center of the vertical wires 1013 by the time the rear plate 1015 has been carried.

(Bonding Rear plate to Face Plate)

Thereafter, the side walls 1016 were placed on the rear plate 1015 through fritted glass (not shown) and the contact surfaces of the side walls 1016 with the face plate 1017 were also coated with fritted glass (not shown). On the inner surface of the face plate 1017, the fluorescent screen 1018 formed of stripe-shaped color fluorescent substances which extend in the Y-direction and the metal back 1019 are provided.

Figure 25A:
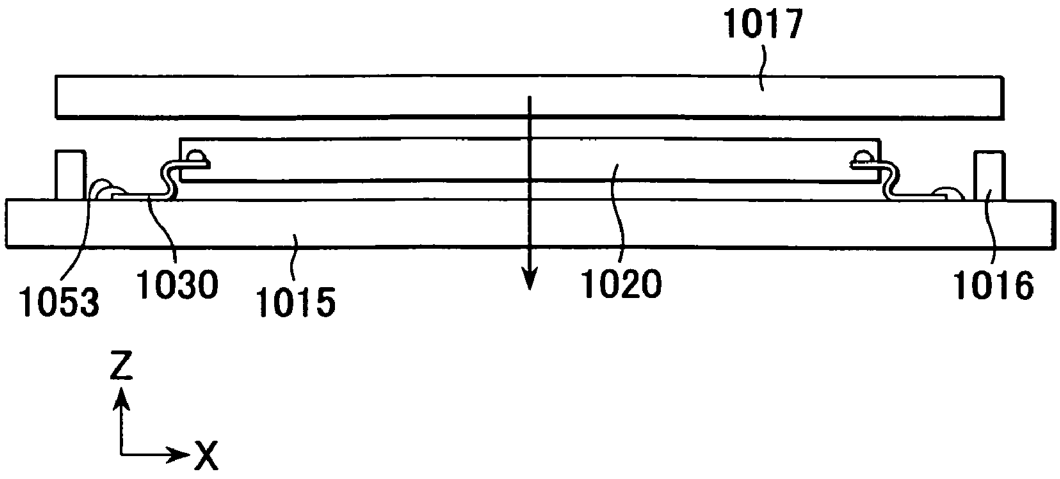
FIGS. 25A and 25B are diagrams for explaining a process of airtightly mounting a panel according to the fourth embodiment of the invention.
Figure 25B:
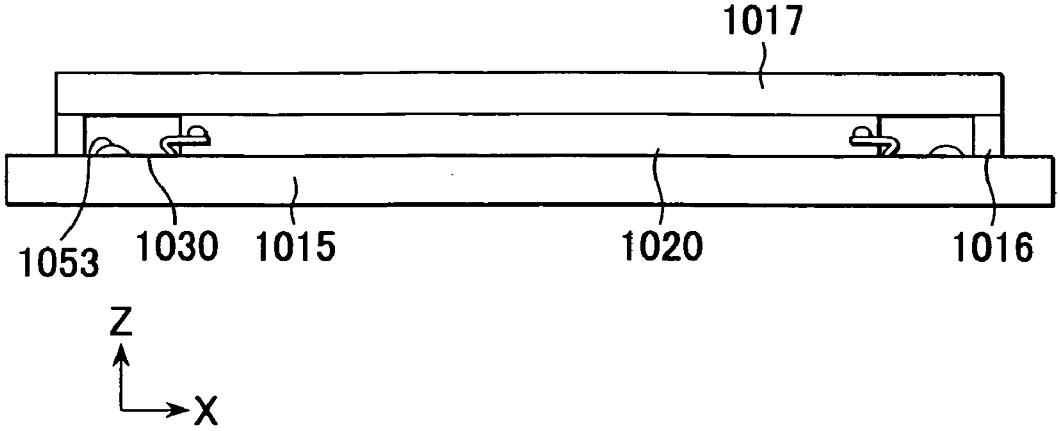
Figure 26:
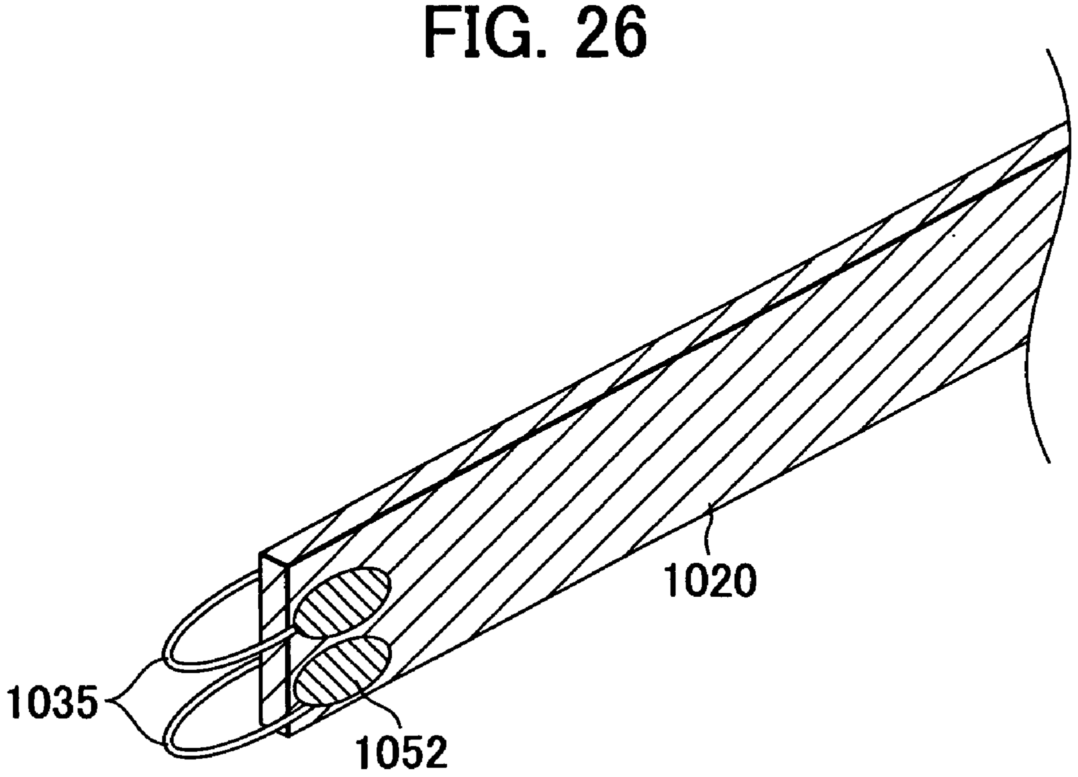
FIG. 26 is a diagram illustrating a state in which a first support member is bonded to a spacer according to a fifth embodiment of the invention.

The face plate 1017 and the rear plate 1015 were heated to 400° C. to 500° C. Subsequently, as shown in FIG. 25A, the rear plate 1015 and the face plate 1017 were opposed such that the surface of the rear plate 1015 which has the electron source is upward and the surface of the face plate 1017 adjacent to the metal back 1019 is downward. They were brought close to each other horizontally, and the spacer 1020 arranged at a distance above the rear plate 1015 was pushed by the metal back 1019 of the face plate 1017 to thereby clamp the spacer 1020 between the rear plate 1015 and the face plate 1017. The spacer-support member 1030 was reduced along the thickness of the rear plate 1015 by elastic deformation to bring the spacer 1020 into contact with the vertical wires 1013 in the electron-releasing region of the rear plate 1015 (FIG. 25B).

Subsequent process of forming the image display device is similar to that of the second example.

Also in this example, an equidistant light-emitting spot train including light-emitting spots by electrons released from the cold cathode elements 1012 near the spacer 1020 was formed to allow a clear and high-color-reproducibility image display.

Fifth Example

In this example, the space body was not brought into contact with the substrate (space was kept between the spacer and the substrate) until a bonding process by using a first spacer-support member at the opposite ends of the spacer and a second spacer-support member of the substrate, thereby eliminating the displacement between the spacer and the substrate which occurs during a carrying process.

The characteristics of this example for making the image display device having the structure shown in FIGS. 29 and 30 will be specifically described hereinafter.

(First Spacer-Support Member)

As a first spacer-support member was used a metal wire or the like which is made of stainless steel or an alloy mainly composed of nickel and iron. In this example, it used a wire 1035 of 0.1 mm in diameter and 20 mm in length. Opposite ends of the two wires 1035 were bonded to the upper and lower parts of the opposite ends of the spacer 1020.

(Second Spacer-Support Member)

A second spacer-support member 1036 is a metal fitting fixed to the rear plate 1015, which was made of stainless steel or an alloy mainly composed of nickel and iron. The characteristics required for the second spacer-support member 1036 include a thermal expansion coefficient closer to that of the spacer 1020 and the substrate.

Figure 27:
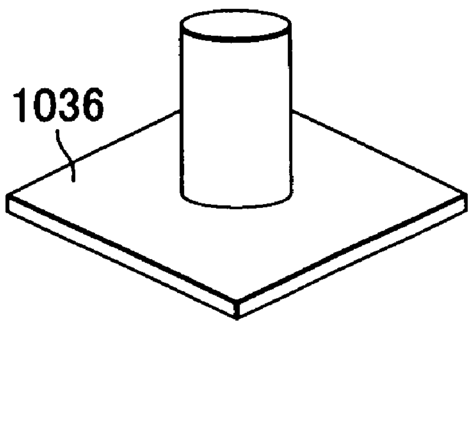
FIG. 27 is a diagram illustrating a second support member according to the fifth embodiment of the invention.

In this example, as shown in FIG. 27, as the second spacer-support member 1036 was used a column of 1 mm in diameter and 1.8 mm in height with a rear-plate-mounting fixing part.

(Joint Member)

An inorganic adhesive including alumina as a base material was used to join the spacer 1020 to the first spacer-support member 1035 and the second spacer-support member 1036 to the rear plate 1015.

(Assembling Rear Plate and Second Support Member)

The center of the column of the second spacer-support member 1036 was accurately aligned outside the electron-releasing region on the extension of the center line of the vertical wires 1013 which is in contact with the spacer 1020 in the electron-releasing region (active area) of the rear plate 1015, and they were joined together with the above-mentioned joint member.

(Mounting Spacer to Rear Plate)

Figure 28A:
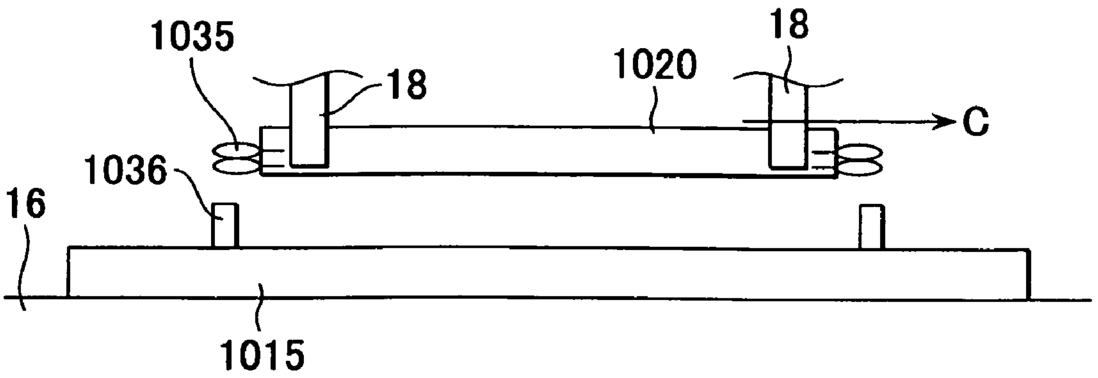
FIGS. 28A to 28C are diagrams for explaining the process of fixing the spacer to a rear plate according to the fifth embodiment of the invention.
Figure 28B:
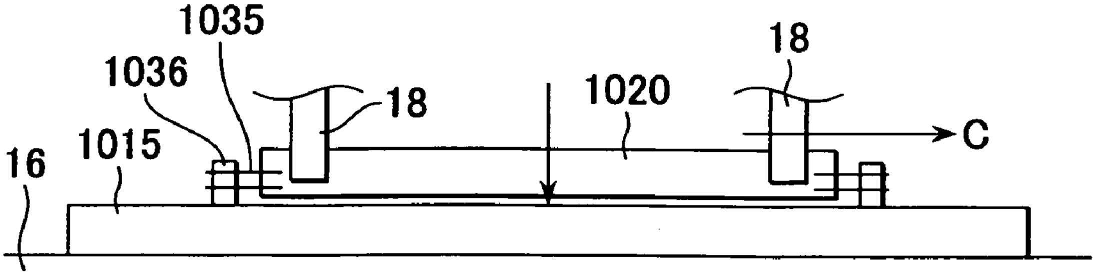
Figure 28C:
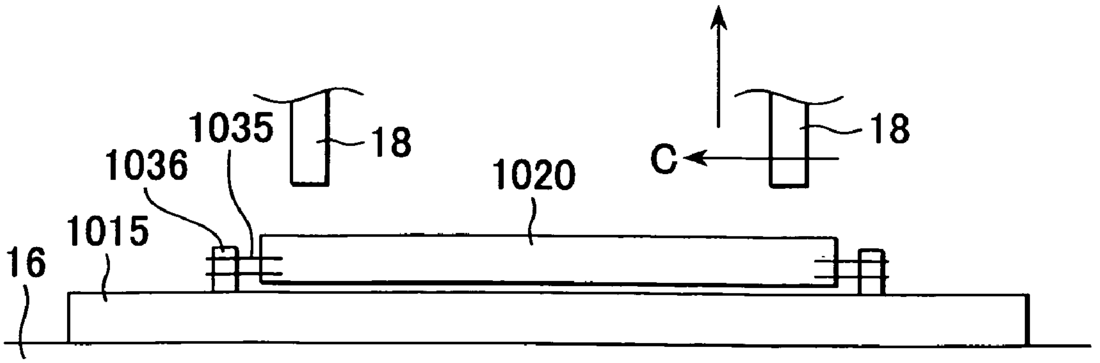

Referring to FIGS. 28A to 28C, assembly of the spacer and the rear plate will be described.

The spacer 1020 to which the metal wires 1035 had been joined was aligned substantially in the center of the vertical wires 1013 in the electron-releasing region of the rear plate 1015, with tension loaded along the length of the spacer 1020, by a spacer assembling unit (FIG. 28A). The ring-shaped parts of the wires 1035 on the opposite ends of the spacer 1020 were hung in the positions of the column of the second spacer-support member 1036 arranged on the rear plate 1015 apart from the rear plate 1015 (FIG. 28B). Finally, the spacer holders 18 of the spacer assembling unit were unclamped to detach the spacer 1020 from the spacer assembling unit (FIG. 28C).

Thus, only the opposite ends of the spacer 1020 were fixed to the rear plate 1015 through the first and second support members, with tension loaded to the spacer 1020, thus forming a space between the center of the spacer 1020 and the rear plate 1015.

The subsequent process of forming the image display device is similar to that of the fourth example.

Also in this example, an equidistant light-emitting spot train including light-emitting spots by electrons released from the cold cathode elements 1012 near the spacer 1020 was formed to allow a clear and high-color-reproducibility image display.

According to the invention, by forming a space between the plate spacer and the surface of the substrate before bonding the first substrate and the second substrate together, even if the center of the spacer is displaced from its initial assembly position, it can be corrected to the designed initial assembly position again.

According to the invention, after the plate spacer has been fixed to the first substrate, the first substrate is carried and then the bonding process is performed. During the carriage, the plate spacer is supported with a space between the center of the spacer and the first substrate, thus preventing bonding with the center of the spacer displaced from the initial assembly position.

This ensures the accuracy of the spacer assembly position irrespective of the way of handling the first substrate before the bonding of the first substrate and the second substrate, preventing the occurrence of beam shift, thus allowing stable production of high-quality image display devices.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method for manufacturing an image display device, comprising the steps of:

fixing opposite ends of a plate spacer to a first substrate while disposing the plate spacer on a surface of the first substrate such that a length of the plate spacer is parallel to the surface of the first substrate and such that the plate spacer between the fixed opposite ends is in contact with the surface of the first substrate; and tightly bonding the first substrate and a second substrate together through the plate spacer while disposing the second substrate to face the first substrate fixed to the plate spacer so that the spacer is arranged in between the first and second substrates, wherein the method further comprises the step of forming a space between the plate spacer and the surface of the first substrate so that the plate spacer between the fixed opposite ends previously in contact with the surface of the first substrate is no longer in contact with the surface of the first substrate after the process of fixing the plate spacer to the first substrate and before the process of bonding the first substrate and the second substrate together to form an image display device.

2. A method for manufacturing an image display device according to claim 1, wherein the process of forming a space is performed by deforming the first substrate.

3. A method for manufacturing an image display device according to claim 1, wherein the process of forming a space is performed by an elastic member provided at each end of the plate spacer.

4. A method for manufacturing an image display device according to claim 3, wherein the elastic member is made of a shape-memory alloy.

5. A method for manufacturing an image display device according to claim 1, wherein in the process of fixing the plate spacer to the first substrate, a tension acting along the length of the plate spacer is loaded on the plate spacer in advance.

6. A method for manufacturing an image display device, comprising the steps of:

providing a first substrate with an electron emission source;

providing a second substrate having imaging means;

fixing opposite ends of a plate spacer to the first substrate while disposing the plate spacer on a surface of the first substrate such that a length of the plate spacer is parallel to a surface of the first substrate and such that the plate spacer between the fixed opposite ends is in contact with the surface of the first substrate;

forming a space between the plate spacer and the surface of the first substrate so that the plate spacer previously in contact with the surface of the first substrate is no longer in contact with the surface of the first substrate; and bonding the first substrate, the second substrate and side walls together and forming a vacuum image display device.

7. A method for manufacturing an image display device according to claim 6, wherein the process of forming a space is performed by deforming the first substrate.

8. A method for manufacturing an image display device according to claim 6, wherein the process of forming a space is performed by providing an elastic member at each end of the plate spacer.

9. A method for manufacturing an image display device according to claim 6, wherein the elastic member is made of a shape-memory alloy.

10. A method for manufacturing an image display device according to claim 6, wherein in the process of fixing the plate spacer to the first substrate, a tension acting along the length of the plate spacer is loaded on the plate spacer in advance.

* * * * *